United States Patent
Rowe et al.

(10) Patent No.: US 11,401,806 B2
(45) Date of Patent: Aug. 2, 2022

(54) VOLUME, SIZE, AND SHAPE ANALYSIS OF DOWNHOLE PARTICLES

(71) Applicant: Halliburton Energy Services, Inc., Houston, TX (US)

(72) Inventors: Mathew Dennis Rowe, Spring, TX (US); Daniel Duncan Blue, III, Houston, TX (US); Prashant Shekhar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/959,014

(22) PCT Filed: Feb. 4, 2019

(86) PCT No.: PCT/US2019/016548
§ 371 (c)(1),
(2) Date: Jun. 29, 2020

(87) PCT Pub. No.: WO2019/152950
PCT Pub. Date: Aug. 8, 2019

(65) Prior Publication Data
US 2020/0332654 A1    Oct. 22, 2020

Related U.S. Application Data

(60) Provisional application No. 62/626,473, filed on Feb. 5, 2018.

(51) Int. Cl.
*E21B 49/00* (2006.01)
*E21B 21/06* (2006.01)
(Continued)

(52) U.S. Cl.
CPC .......... *E21B 49/005* (2013.01); *E21B 21/065* (2013.01); *E21B 47/04* (2013.01);
(Continued)

(58) Field of Classification Search
CPC ...... E21B 49/005; E21B 21/065; E21B 47/04; E21B 37/00; E21B 43/267; E21B 47/003;
(Continued)

(56) References Cited

U.S. PATENT DOCUMENTS

| 4,736,297 A | 4/1988 | Lejeune |
| 4,739,655 A * | 4/1988 | Greer ............... E21B 49/005 |
| | | 73/152.03 |

(Continued)

FOREIGN PATENT DOCUMENTS

| AU | 2011383364 B2 | 6/2013 |
| CN | 101386235 A | 3/2009 |

(Continued)

OTHER PUBLICATIONS

PCT Application Serial No. PCT/US2019/016548, International Search Report, dated May 20, 2019, 3 pages.
(Continued)

*Primary Examiner* — Nicole Coy
(74) *Attorney, Agent, or Firm* — Delizio, Peacock, Lewin & Guerra

(57) ABSTRACT

An imaging device (124), laser(s) (190, 192), lag calculation, and/or volume calculations are used to determine cuttings volume per unit depth. A projected or theoretical volume can be calculated based on parameters of the borehole being drilled. At the surface of the borehole, cuttings can be captured in a shaker screen (108). The volume of the cuttings can then be directly measured on the shaker screen. Deviations from a projected volume can be logged and notifications can be communicated on and/or offsite of the borehole. Additionally, size and shape of cuttings can be logged. Deviations from projected size and shape can also be logged. Various hydrocarbon recover}' operations can be altered based on results of the cuttings analysis and other
(Continued)

indicators of improper hole cleaning. For instance, the drilling can be stopped, or a direction of the borehole can be altered.

17 Claims, 24 Drawing Sheets

(51) Int. Cl.
  *E21B 47/04* (2012.01)
  *G01F 22/00* (2006.01)
  *G01N 15/02* (2006.01)
  *E21B 37/00* (2006.01)
  *E21B 43/267* (2006.01)

(52) U.S. Cl.
  CPC ......... *G01F 22/00* (2013.01); *G01N 15/0227* (2013.01); *E21B 37/00* (2013.01); *E21B 43/267* (2013.01); *G01N 2015/0294* (2013.01)

(58) Field of Classification Search
  CPC ..... E21B 21/06; G01F 22/00; G01N 15/0227; G01N 2015/0294; G01N 15/02
  See application file for complete search history.

(56) References Cited

U.S. PATENT DOCUMENTS

| | | | |
|---|---|---|---|
| 5,663,559 A | 9/1997 | Auzerais et al. |
| 5,947,213 A | 9/1999 | Angle et al. |
| 6,378,627 B1 | 4/2002 | Tubel et al. |
| 6,386,297 B1 | 5/2002 | Cooley et al. |
| 7,139,219 B2 | 11/2006 | Kollé et al. |
| 7,272,504 B2 | 9/2007 | Akimov et al. |
| 7,299,136 B2 | 11/2007 | DiFoggio et al. |
| 7,446,885 B2 | 11/2008 | Zabolitzky et al. |
| 7,634,059 B2 | 12/2009 | Wraight |
| 7,705,294 B2 | 4/2010 | Ramstad et al. |
| 7,835,568 B2 | 11/2010 | Park et al. |
| 8,483,445 B2 | 7/2013 | Tjhang et al. |
| 8,550,158 B1 | 10/2013 | Shaposhnikov |
| 8,567,526 B2 | 10/2013 | Johnston et al. |
| 9,228,401 B2 | 1/2016 | Edwards et al. |
| 9,576,374 B2 | 2/2017 | Elkington et al. |
| 10,174,578 B2 | 1/2019 | Walton et al. |
| 10,509,141 B2 | 12/2019 | Maeso et al. |
| 10,605,077 B2 | 3/2020 | Aird |
| 10,634,807 B2 | 4/2020 | Tang et al. |
| 2005/0216197 A1 | 9/2005 | Zamora et al. |
| 2007/0165225 A1 | 7/2007 | Trainer |
| 2007/0189119 A1 | 8/2007 | Klotz et al. |
| 2008/0056604 A1 | 3/2008 | Choe et al. |
| 2008/0192987 A1 | 8/2008 | Helgason et al. |
| 2009/0020333 A1 | 1/2009 | Marsh |
| 2009/0087911 A1 | 4/2009 | Ramos et al. |
| 2009/0259446 A1 | 10/2009 | Zhang et al. |
| 2010/0135536 A1 | 6/2010 | Dvorkin et al. |
| 2011/0272144 A1 | 11/2011 | Belcher et al. |
| 2012/0076364 A1 | 3/2012 | Tjhang et al. |
| 2014/0020954 A1 | 1/2014 | Pelletier et al. |
| 2014/0046628 A1 | 2/2014 | Ligneul et al. |
| 2014/0254884 A1 | 9/2014 | Elkington et al. |
| 2014/0333754 A1 | 11/2014 | Graves et al. |
| 2015/0330215 A1 | 11/2015 | Jamison et al. |
| 2016/0370274 A1 | 12/2016 | Rowe et al. |
| 2017/0058620 A1 | 3/2017 | Torrione |
| 2017/0153355 A1 | 6/2017 | Little, III et al. |

FOREIGN PATENT DOCUMENTS

| | | |
|---|---|---|
| WO | 8202573 A1 | 8/1982 |
| WO | 2009069004 A2 | 6/2009 |
| WO | 2013089683 A1 | 6/2013 |
| WO | 2013105930 A1 | 7/2013 |
| WO | 2015002653 A1 | 1/2015 |
| WO | 2015156893 A1 | 10/2015 |
| WO | 2016171650 A1 | 10/2016 |

OTHER PUBLICATIONS

PCT Application Serial No. PCT/US2019/016548, Written Opinion, dated May 20, 2019, 7 pages.
PCT Application Serial No. PCT/US2019/032967, International Search Report, dated Aug. 23, 2019, 3 pages.
PCT Application Serial No. PCT/US2019/032967, Written Opinion, dated Aug. 23, 2019, 7 pages.
PCT Application Serial No. PCT/US2019/035002, International Search Report, dated Sep. 19, 2019, 3 pages.
PCT Application Serial No. PCT/US2019/035002, Written Opinion, dated Sep. 19, 2019, 5 pages.
U.S. Appl. No. 14/363,264, Advisory Action, dated Apr. 29, 2016, 3 pages.
U.S. Appl. No. 14/363,264, Final Office Action, dated Feb. 10, 2016, 11 pages.
U.S. Appl. No. 14/363,264, Non-Final Office Action, dated Aug. 12, 2015, 9 pages.
U.S. Appl. No. 14/363,264, Preliminary Amendment, filed Jun. 5, 2014, 3 pages.
U.S. Appl. No. 14/363,264, Response filed Apr. 5, 2016 to Final Office Action, dated Feb. 10, 2016, 10 pages.
U.S. Appl. No. 14/363,264, Response filed Nov. 6, 2015 to Non-Final Office Action dated Aug. 12, 2015, 8 pages.
Australian Application Serial No. 2011383364, First Examiner Report, dated Dec. 11, 2014, 3 pages.
Australian Application Serial No. 2011383364, Response filed Jan. 20, 2015 to First Examiner Report dated Dec. 11, 2014, 3 pages.
Canadian Application Serial No. 2,857,484, Office Action, dated May 12, 2017, 4 pages.
Canadian Application Serial No. 2,857,484, Office Action, dated Jun. 2, 2016, 4 pages.
Canadian Application Serial No. 2,857,484, Office Action, dated Aug. 25, 2015, 3 pages.
Canadian Application Serial No. 2,857,484, Response filed Jan. 26, 2016 to Office Action dated Aug. 25, 2015, 9 pages.
Chinese Application Serial No. 201180075476, Office Action, dated Oct. 24, 2017, 11 pages.
Chinese Application Serial No. 201180075476.6, Office Action, dated Sep. 20, 2016, 13 pages.
European Application Serial No. 11877269.8, Extended European Search Report, dated Jul. 28, 2015, 13 pages.
European Application Serial No. 11877269.8, Office Action, dated Jul. 15, 2014, 3 pages.
European Application Serial No. 11877269.8, Response filed Feb. 17, 2016 to Extended European Search Report dated Jul. 28, 2015, 14 pages.
European Application Serial No. 11877269.8, Response filed Aug. 19, 2014 to Office Action dated Jul. 15, 2014, 7 pages.
Gulf Cooperation Council Application Serial No. 2012/23017, Office Action, dated Jan. 18, 2016, 4 pages.
Gulf Cooperation Council Application Serial No. 2012/23017, Office Action, dated Jun. 21, 2016, 4 pages.
Gulf Cooperation Council Application Serial No. 2012/23017, Response filed Apr. 4, 2016 to Office Action dated Jan. 18, 2016, 6 pages.
PCT Application Serial No. PCT/US2011/064644, International Search Report, dated Mar. 29, 2012, 2 pages.
PCT Application Serial No. PCT/US2011/064644, International Preliminary Report on Patentability, dated Feb. 20, 2014, 8 pages.
PCT Application Serial No. PCT/US2011/064644, Response/Demand filed May 15, 2012 to Written Opinion dated Mar. 29, 2012, 3 pages.
PCT Application Serial No. PCT/US2011/064644, Written Opinion, dated Mar. 29, 2012, 6 pages.
Malaysian Application Serial No. PI 2014701575, Substantive Examination Adverse Report, dated Nov. 15, 2017, 3 pages.

(56) References Cited

OTHER PUBLICATIONS

Malaysian Application Serial No. PI 2014701575, Preliminary Examination—Clear Formalities Report, dated Sep. 3, 2014, 2 pages.
Guilherme, et al., "Petroleum well drilling monitoring through cutting image analysis and artificial intelligence techniques", Engineering Applications of Artificial Intelligence 24.1, 2011, pp. 201-207.
U.S. Appl. No. 16/428,458, Final Office Action, dated Feb. 5, 2021, 13 pages.
U.S. Appl. No. 16/428,458, Non-Final Office Action, dated Oct. 9, 2020, 12 pages.
U.S. Appl. No. 16/428,458; Non Final Office Action; dated Aug. 23, 2021, 13 pages.

\* cited by examiner

VOLUME, SIZE, AND SHAPE ANALYSIS OF DOWNHOLE PARTICLES

TECHNICAL FIELD

The disclosure generally relates to the field of hydrocarbon recovery operations, and more particularly to volume, size, and shape analysis of downhole particles.

BACKGROUND

Increasing the effectiveness of pumping, sweeping, drilling operations, fracturing operations, etc. can reduce the cost of hydrocarbon recovery operations. An approach to increasing the effectiveness of such operations is to observe the characteristic features of various particles returning to the Earth's surface from downhole during different hydrocarbon recovery operations.

BRIEF DESCRIPTION OF THE DRAWINGS

Embodiments of the disclosure may be better understood by referencing accompanying drawings.

DESCRIPTION OF EMBODIMENTS

Figure 1:
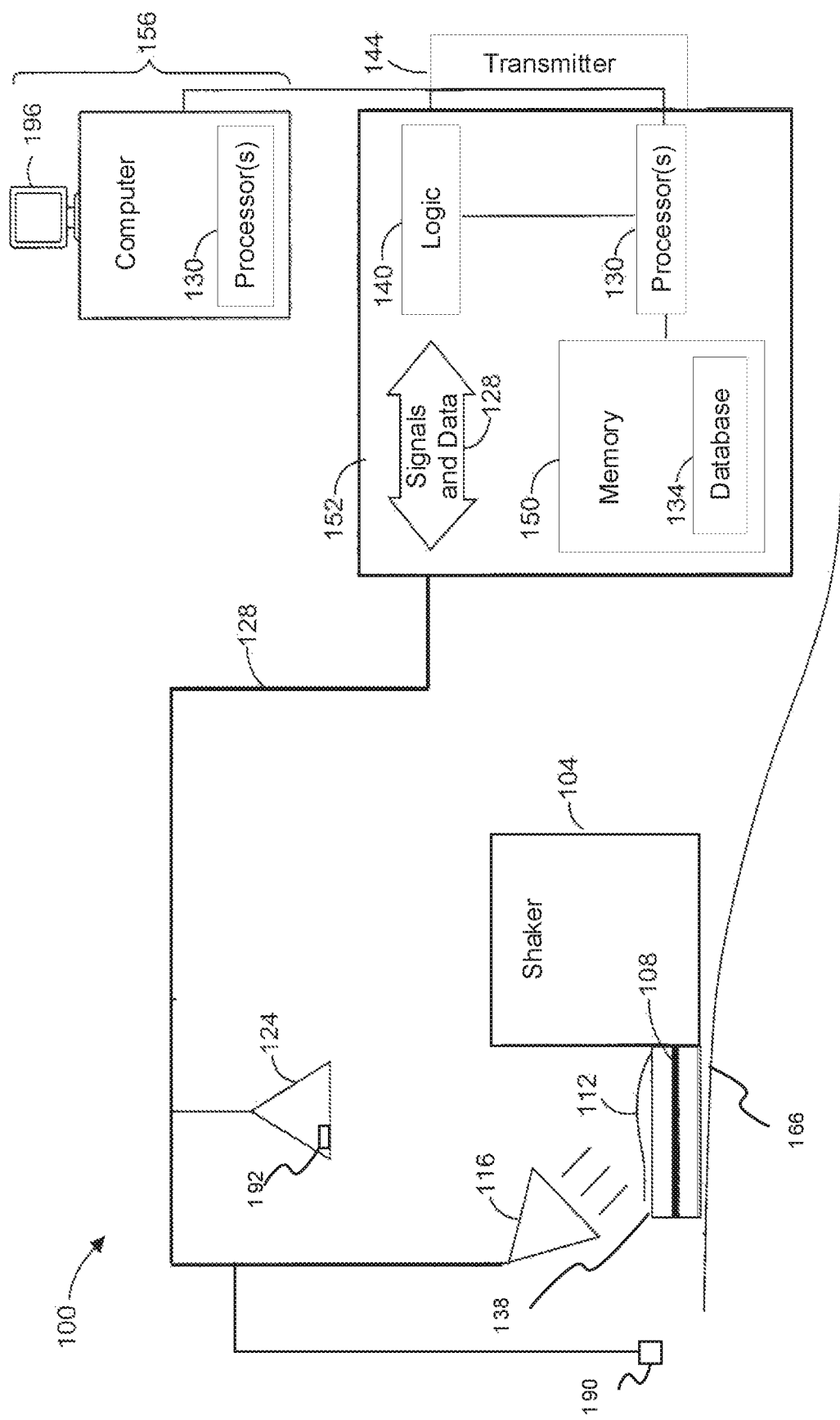
FIG. 1 is a block diagram of an example system for processing and analyzing of downhole particles, according to some embodiments.

The description that follows includes example systems, methods, techniques, and program flows that embody embodiments of the disclosure. However, it is understood that this disclosure may be practiced without these specific details. For instance, this disclosure refers to drilling and fracturing operations for downhole particle analysis. Aspects of this disclosure can be also applied to any other applications that return downhole particles to the surface. In other instances, well-known instruction instances, protocols, structures and techniques have not been shown in detail in order not to obfuscate the description.

Various embodiments relate to processing and analyzing particles returned to the Earth's surface from a borehole. For example, the particles can be drill cuttings returning to the surface from downhole during drilling of the borehole. In another example, the particles can be the proppants and any other particles (e.g., portions of the formation) that return to the surface during or after hydraulic fracturing operations.

Some embodiments use a camera(s), laser(s), lag calculation, and/or volume calculations to determine cuttings volume per unit depth. A projected or theoretical volume can be calculated based on parameters of the borehole being drilled (e.g., diameter). Also, the projected volume can be calculated as a function of time. At the surface of the borehole, cuttings can be captured in a shaker screen, allowing the drilling fluid to be removed. The volume of the cuttings can then be directly measured on the shaker screen. These volume measurements can be logged. Deviations from a projected volume can be logged and parties are notified on and/or off site of the borehole. Additionally, size and shape of cuttings can be logged. Deviations from projected size and shape can also be logged and parties notified on and/or off site. For example, if a solid particle with a known volume, size and shape is pumped down the borehole during hydraulic fracturing, the particles returned to the surface with the known size and shape can be accounted for in volume. Accordingly, particles of other sizes and shapes returned to the surface can be assumed to be from the formations downhole.

In some embodiments, results of this analysis can be used to alter various hydrocarbon recovery operations. For example, if the particles are received at the surface as a result of drilling operations, the drilling operations can be modified. For instance, the drilling can be stopped, or a direction of the borehole can be altered. Other examples of modified drilling operations can include replacement of parts of the drill string (e.g., the drill bit), a change in the weight of the drilling mud or flow rate, performing a borehole clean out, etc. For hydraulic fracturing operations, results of this analysis can be used to project the potential recovery of hydrocarbons from this current borehole. Additionally, results of this analysis can be used in drilling subsequent boreholes in a similar geographic region. For instance, if a level of proppants that are not retained in the formation is too high (returning to the surface instead), the direction or depth of the drilling of subsequent boreholes can be altered. Alternatively or in addition, the location or number of fractures in subsequent boreholes can be altered.

Example System

FIG. 1 is a block diagram of an example system for processing and analyzing of downhole particles, according to some embodiments. In many embodiments, a system 100 comprises a combination of an imaging device 124 and one or more processors 130. The imaging device 124 and/or the processors 130 may be located above the surface 166 of a geological formation, perhaps forming part of a data acquisition system 152. In some embodiments, any of the components in FIG. 1 may be located below the surface 166.

The system 100 may also include logic 140, perhaps comprising a programmable data acquisition subsystem. The logic 140 can be used to acquire live video stream information 128, and other data, such as information from down hole, including the depth of the drill bit during a drilling operation.

A memory 150, located above or below the surface 166, can be used to store acquired image data, as well as other data (e.g., perhaps in a database 134). The memory 150 is communicatively coupled to the processor(s) 130.

In some embodiments, the imaging device 124 may comprise one or more CCD (charge coupled device) cameras, including low light or infrared cameras, to be used in conjunction with one or more sources of illumination 116, such as white light, tungsten light, infrared light, or light emitting diodes (LEDs) to illuminate cuttings 112 deposited on a shaker 104, such as on a shaker screen 108 (also referred to herein as a "drilling mud screen 108"). The cameras may be focused on the shaker screen 108 to capture images of cuttings 112 as they move across one or more shakers 104.

The imaging device 124 can be connected to a data acquisition system 152, perhaps including the logic 140, and then to a computer (comprising one or more processors 130), or directly to a computer. The computer may use a three-dimensional (3D) face recognition program or particle size analysis program to measure and determine characteristics of the cuttings 112, such as size, volume, shape, etc. The live data can be analyzed in real-time to provide shape and size distribution, along with the volume of the cuttings 112 coming over the shaker 104.

The system 100 also includes one or more lasers. In this example, a laser 192 that is incorporated into the imaging device 124 is positioned above the cuttings 112. The system 100 also includes a laser 190 positioned to a side of the cuttings 112. The system 100 can include more or less lasers. For example, the system 100 can include additional lasers at other positions relative to the cuttings 112. As part of the processing and analysis of the cuttings 112, the lasers 190-192 can emit a coherent radiation into the cuttings 112. A line of the coherent radiation may deflect as a result of contacting particles of a detectable thickness. The distance between the original line of coherent radiation and the deflected line can be analyzed to determine the thickness of the particle(s) which cause the line of coherent radiation to deflect (e.g., through triangle properties). An actual surface area of the cuttings 112 can then be determined based on the captured coherent radiation. Volume of the cuttings 112 can be obtained by multiplying the surface area of the cuttings 112 (determined by laser 190 and/or 192 deflection) and the velocity of cuttings 112 passing over the laser line. The velocity of the cuttings 112 may be determined using an approach of tracking a particle over a certain distance for a certain amount of time. The imaging device 124 in conjunction with a velocity capture algorithm can be used to track the velocity of the particle/cuttings 112. Other methods using radars may also be used to determine velocity of particles. Accurate volume measurements should be taken since no physical measurements may be taken. Additionally, noise in form of vibration on the shaker 104 should be filtered out. This can be done by mounting a reference target on a static portion of the shaker 104 and capturing the pixel movement using the imaging device 124. An algorithm may be used to capture the pixel movement on the shaker 104. Other methods using accelerometers may also be used to baseline the vibrations on the shaker screen 108.

The illumination source 116 may comprise white lights for CCD cameras or near, mid, or far wave infrared lights, depending on the type of imaging device 124 that is used. The illumination source 116 may be used to intensify the image. The imaging device 124, such as a camera, can capture various images of the cuttings 112. The field of view, detection wavelength sensitivity, and resolution of the imaging device 124 may be used to determine the number and type of devices 124 that are focused on the shaker 104.

Imaging devices may comprise, for example, a pco 4000 CCD camera from Adept Turnkey Pty Ltd. with 4008×2672 pixel resolution for the visible light spectrum. If the conditions are such that a high sensitivity line scan camera may be useful, a Piranha HS-80-08K40 camera or Piranha HS-40-04K40 camera, also from Adept Turnkey Pty Ltd. can be used. For near infrared imaging, an XEVA-FPA-1.7- 640 camera from the LOT-Oriel Group Europe with an InGaAs array at 640×512 resolution can be used. For mid infrared imaging, a VarioTHERM® InSb camera from JENOPTIK Optical Systems Inc. with an InSb array at 640×512 resolution can be used. For far infrared detection, a Photon 640 camera from FLIR Systems, Inc. can be employed. Other devices can also be used.

The video stream information 128, or a processed form of the information, can be sent to a remote workstation 156 via coaxial cable or Ethernet cable. For longer data transmission distances, and to reduce the magnitude of possible interference, the video stream information 128 may be converted to an optical format and sent to the remote workstation 156 via fiber optic transmission. A transmitter 144 may be used to send the video stream information 128 or a processed form of the information, to the workstation 156 via wires, fiber optics, or wirelessly.

Programs that provide face recognition and particle size analyzer analysis are commercially available. Three-dimensional face recognition software can be used to identify more than just the general shape of cuttings the volume distribution of the cuttings can also be determined. The software can be trained or modified to identify cutting shapes, to determine volume distribution, and to provide data in a form that various monitoring software, such as Halliburton's INSITE Anywhere® web delivery system, can process.

These recognition and analysis programs include software that is similar to or identical to PAX-it image management and analysis software by MIS Inc. of Villa Park, Ill. and the Split-Online® automated digital image analysis system from Split Engineering LLC, as well as the SureMatch 3D facial recognition software suite available from Genex Technologies, Inc. of Bethesda, Md. Other software and processing instructions may be used, based on technical needs and flexibility.

The acquired video stream information 128 can be processed by programs similar to or identical to the INSITE Anywhere® web delivery system for real-time trend analysis. The processed data, which can be stored in the memory 150 (e.g., in the database 134) includes particle size distribution, particle shape distribution, and cutting volume. Thus, many embodiments may be realized.

For example, the system 100 may comprise an imaging device 124 and one or more processors 130. The imaging device 124 may be configured to acquire live video stream information 128 including down hole cuttings image information. The processor(s) 130 may be configured to process the down hole cuttings image information to determine data that quantifies the shape, size distribution, and/or volume of the down hole cuttings. The processor(s) 130 may also be configured to publish changes in the data in conjunction with probable conditions associated with a borehole drilling operation or a borehole fracturing operation.

Elements can be added to the path of energy travel to selectively reduce the amount of energy received by the imaging device 124. Thus, the system 100 may comprise polarizers, filters, or beam splitters to intercept energy reflected or emitted by the downhole cuttings 112 ("cuttings 112"), and to reduce the amount of the energy received by the imaging device 124. One or more cameras can be used as the imaging device. Thus, the imaging device 124 may comprise one or more visible light cameras and/or infrared cameras. Additional embodiments may be realized.

Example Drilling Application

Figure 2:
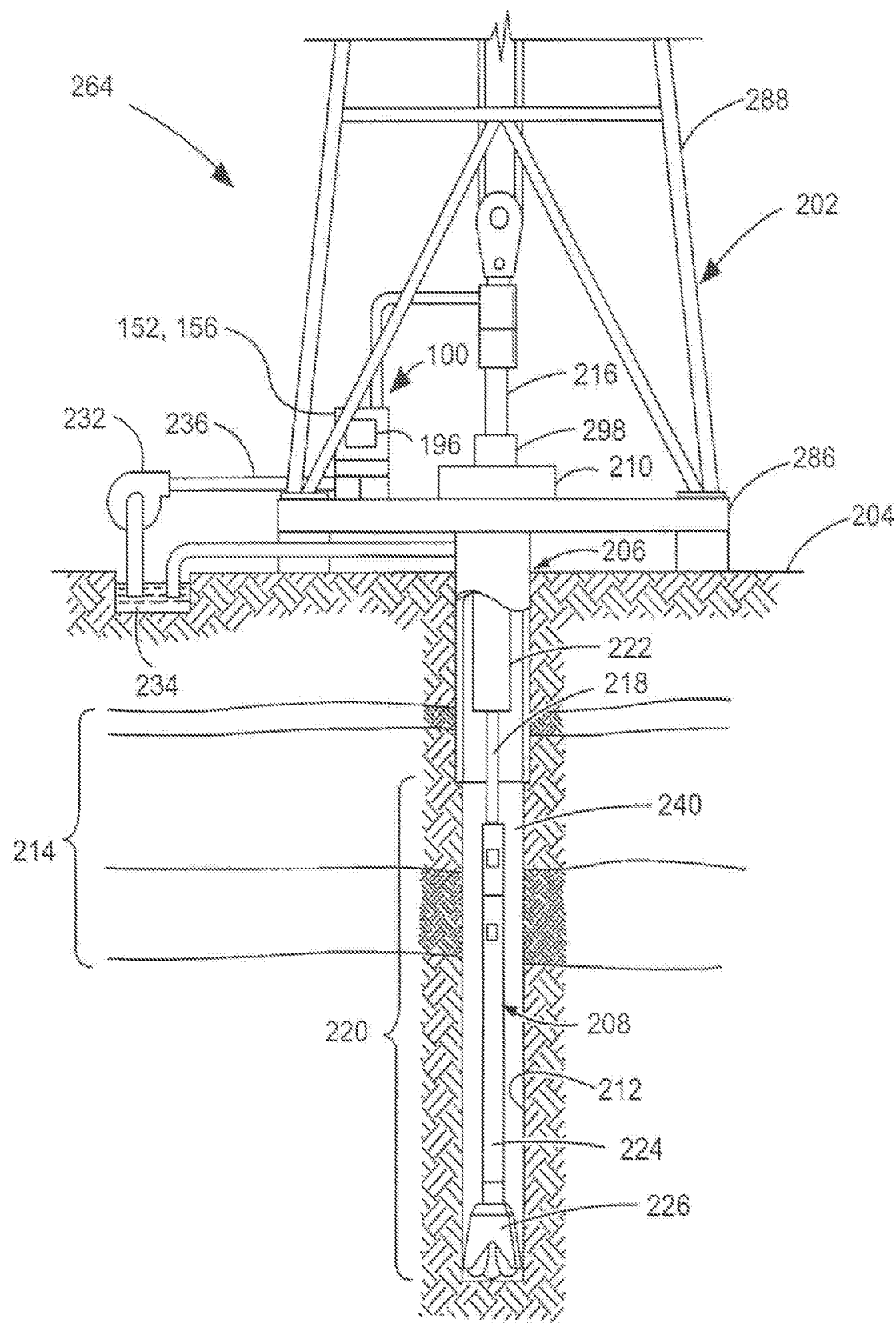
FIG. 2 is a schematic diagram of a drilling rig system, according to some embodiments.

FIG. 2 is a schematic diagram of a drilling rig system, according to some embodiments. For example, in FIG. 2 it can be seen how a system 264 may also form a portion of a drilling rig 202 located at the surface 204 of a well 206. Drilling of oil and gas wells is commonly carried out using a string of drill pipes connected together so as to form a drilling string 208 that is lowered through a rotary table 210 into a wellbore or borehole 212. Here a drilling platform 286 is equipped with a derrick 288 that supports a hoist.

The drilling rig 202 may thus provide support for the drill string 208. The drill string 208 may operate to penetrate the rotary table 210 for drilling the borehole 212 through subsurface formations 214. The drill string 208 may include a Kelly 216, drill pipe 218, and a bottom hole assembly 220, perhaps located at the lower portion of the drill pipe 218.

The bottom hole assembly 220 may include drill collars 222, a down hole tool 224, and a drill bit 226. The drill bit 226 may operate to create a borehole 212 by penetrating the surface 204 and subsurface formations 214. The down hole tool 224 may comprise any of a number of different types of tools including MWD tools, LWD tools, and others.

During drilling operations, the drill string 208 (perhaps including the Kelly 216, the drill pipe 218, and the bottom hole assembly 220) may be rotated by the rotary table 210. In addition to, or alternatively, the bottom hole assembly 220 may also be rotated by a motor (e.g., a mud motor) that is located down hole. The drill collars 222 may be used to add weight to the drill bit 226. The drill collars 222 may also operate to stiffen the bottom hole assembly 220, allowing the bottom hole assembly 220 to transfer the added weight to the drill bit 226, and in turn, to assist the drill bit 226 in penetrating the surface 204 and subsurface formations 214.

During drilling operations, a mud pump 232 may pump drilling fluid (sometimes known by those of ordinary skill in the art as "drilling mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 212. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 214 cuttings created by operating the drill bit 226. It is the images of these cuttings that many embodiments operate to acquire and process.

Thus, referring now to FIGS. 1-2, it may be seen that in some embodiments, a system 264 may comprise a drilling mud screen 108 to receive drilling mud, and one or more image processing system 100 as described previously. The image processing system 100 may be configured to have a field of view that includes the drilling mud screen 108, wherein the system 100 includes one or more imaging devices 124 and one or more processors 130, operating as described previously.

The drilling mud screen 108 may form part of a shaker deck, such as a shale shaker deck. Thus, the drilling mud screen 108 may be included in a shaker deck 138.

The processed data (e.g., cutting shape, size, volume) can be displayed to show changes that have occurred, and the operational conditions that are likely to be associated with those types of changes. Thus, the system 264 may comprise a display 196 to display the changes and the probable conditions. These conditions may be used to implement real-time control in some embodiments (e.g., if falling shale is indicated by a dramatic increase in cutting size and volume, the weight on the bit may be reduced, or drilling may be halted entirely).

A transmitter can be used to send the data (e.g., cutting shape, size, volume) to a remote location, such as a workstation 156, perhaps for alarming, further processing/analysis, or real-time operational control. Thus, a system 264 may comprise a transmitter 144 to transmit at least a portion of the data to a remote processor. Many embodiments may thus be realized.

It should also be understood that the apparatus and systems of various embodiments can be used in applications other than for pumping and drilling operations, and thus, various embodiments are not to be so limited. The illustrations of system 100 and systems 264 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

A rig is surveyed to determine number of shakers present and number of needed cameras to cover shaker surface area. Ambient light can also be measured to determine if additional lighting is needed. Determination can be made whether cameras will need support structure or can be mounted on surface with line of sight of the shaker. Determination whether additional lighting is needed can also be made. Cameras with lasers and possible additional lighting can be sent to rig site with computers setup to handle the data rate for processing and analyzing the downhole particles. Lasers can be used to determine depth of investigation and as a point of reference. Cameras can be mounted on a support structure or other flat surface that gives line of sight of the shakers with possible additional lighting.

A communication cable and possible power cable can be run from nearest point of power and data acquisition point. The data acquisition device can be a computer of some other device with the capability to interpret or transmit the pictures to a software program. The software program may or may not have to be calibrated using objects with a known volume that may or may not be of different shapes. The calibration could occur on the shakers themselves or on another flat surface with the same focal length To determine the depth that the cuttings from which the cuttings originate downhole, bit depth and lag can be monitored. Bit depth can be derived from the amount of pipe in the borehole. For example, hit depth can be based on the number of joints of pipe in the hole and knowing the length of all the joints or by monitoring the draw works and determining how much the block has traveled while adding pipe to the borehole. Lag can be determined based on a location of the drill bit, the pump rate in either strokes or volume per unit of time, and the volume of the annulus.

When a foot of formation is drilled and knowing the bit and reamer size, the volume of formation can be calculated based on a unit of depth of the formation that has been drilled, the size of the drill bit, and size of the reamer. The return of this volume of formation to the surface can be determined based on the lag.

The camera system and software can measure the volume of rock returning to surface. The computer system may maintain a discrete or cumulative volume of cuttings per discrete depth interval or/and as a discrete cumulative volume of cuttings per discrete time. The data in the form of pictures and/or volumes may be stored at the well site and/or transmitted off site. If drilling fluid is not removed from the cuttings, an erroneous volume would be calculated. If shaker screens become flooded with cuttings or fluid, an erroneous volume would also be calculated. In some embodiments, the drilling fluid maintained on the cuttings will not calculated and no method will be used to remove wetting of cuttings. The drilling fluid left on cuttings can be considered an error of measurement.

Volume-Based Analysis Operations of Downhole Drill Cuttings

Figure 3:
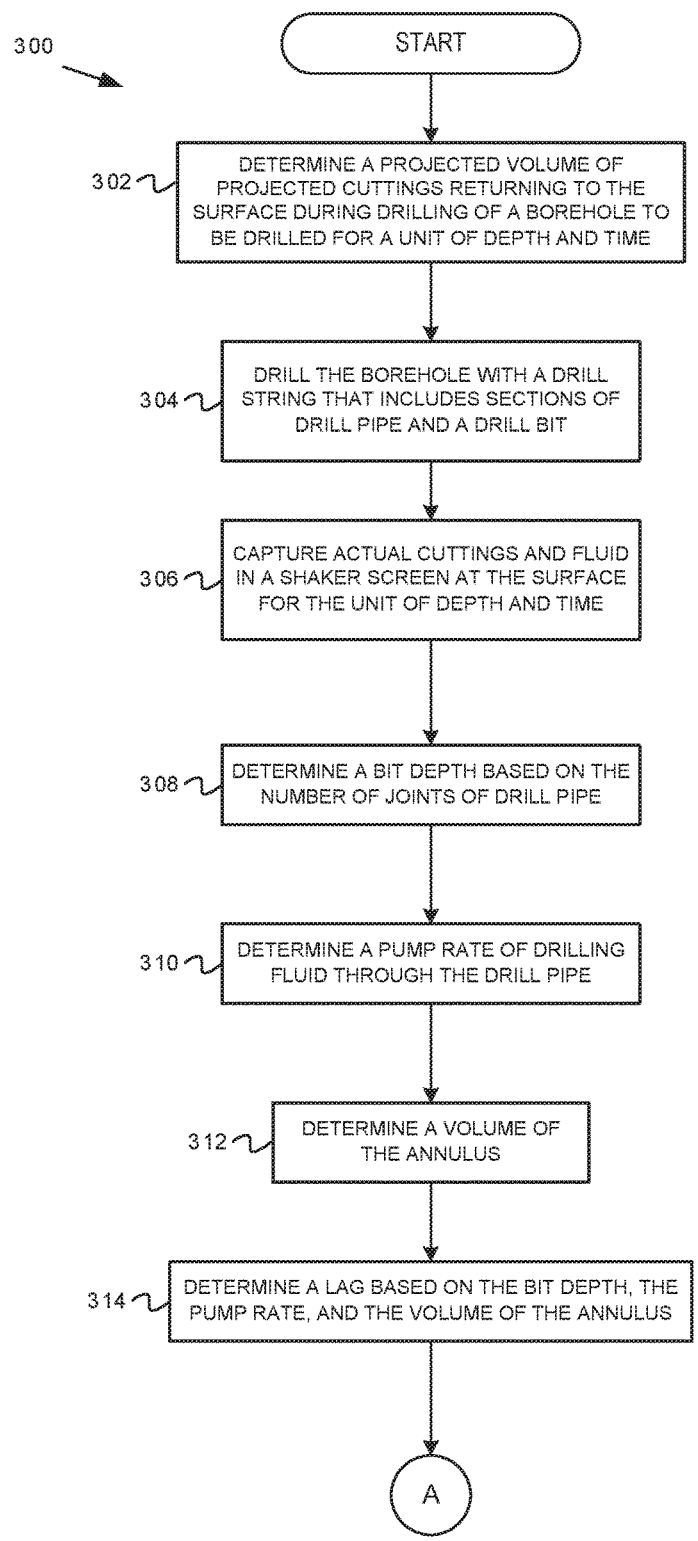
FIGS. 3-5 are flowcharts of operations for evaluating and possibly altering downhole drilling operations based on analysis of volume of downhole cuttings, according to some embodiments.
Figure 4:
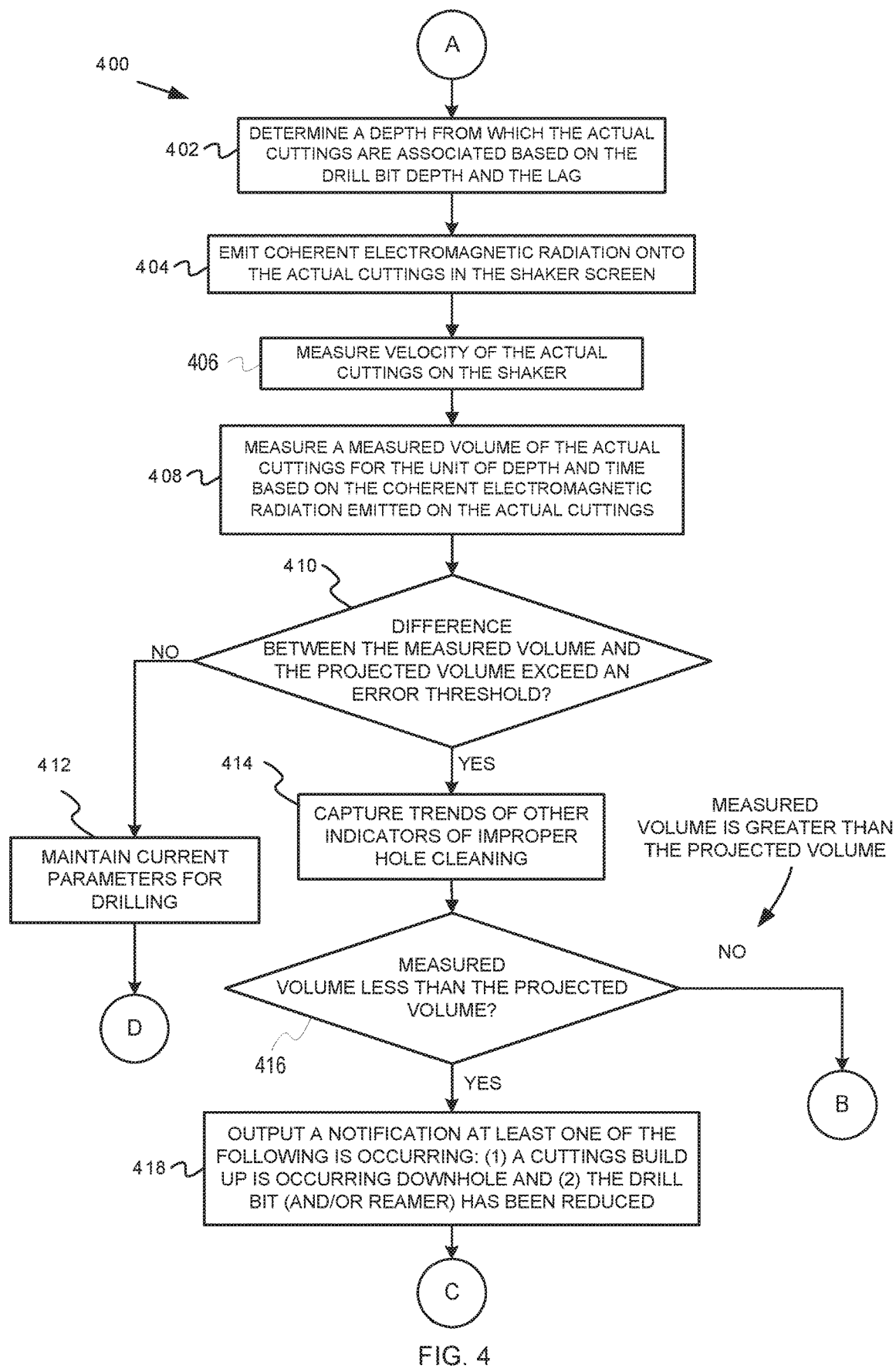
Figure 5:
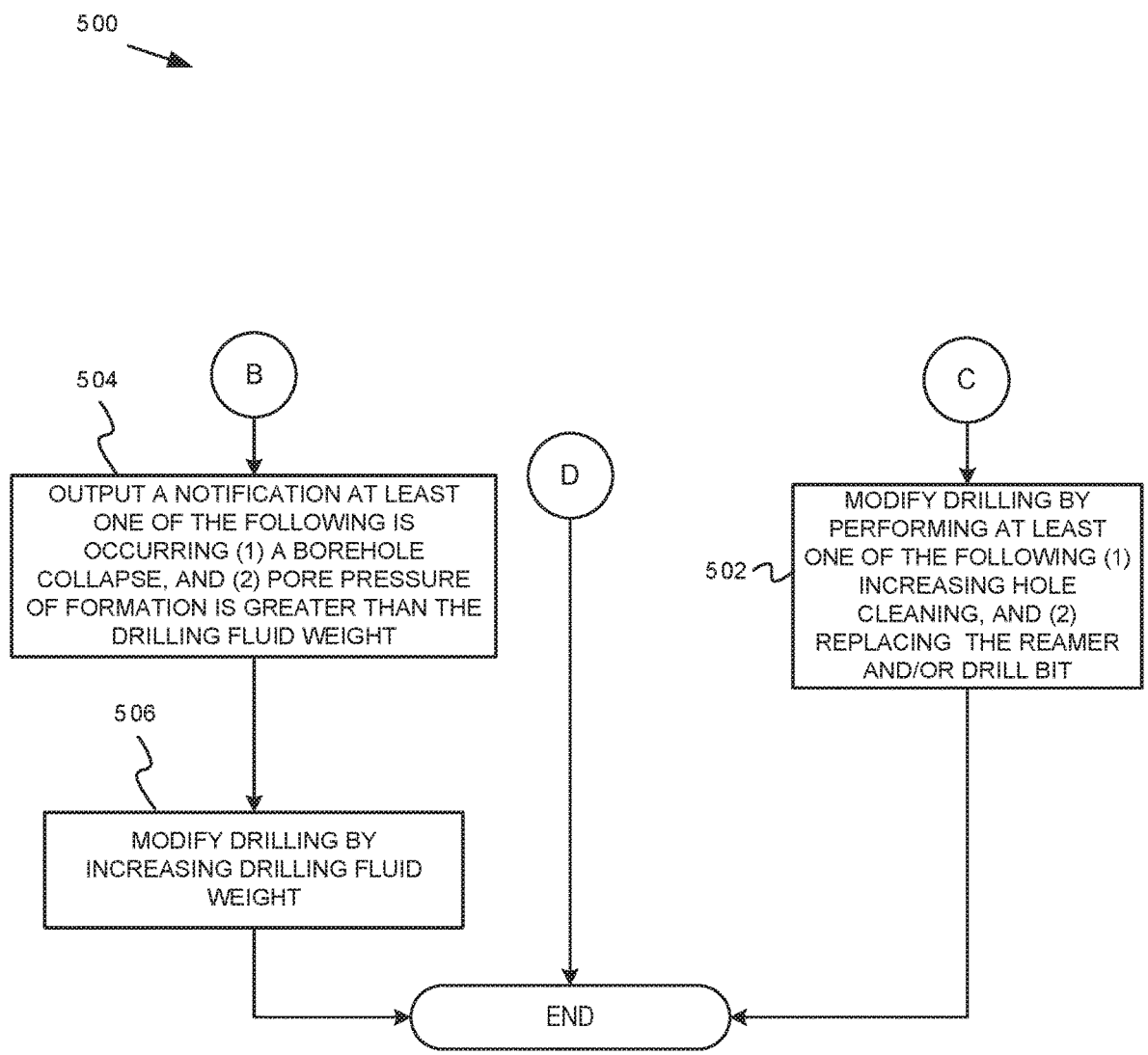
Figure 6:
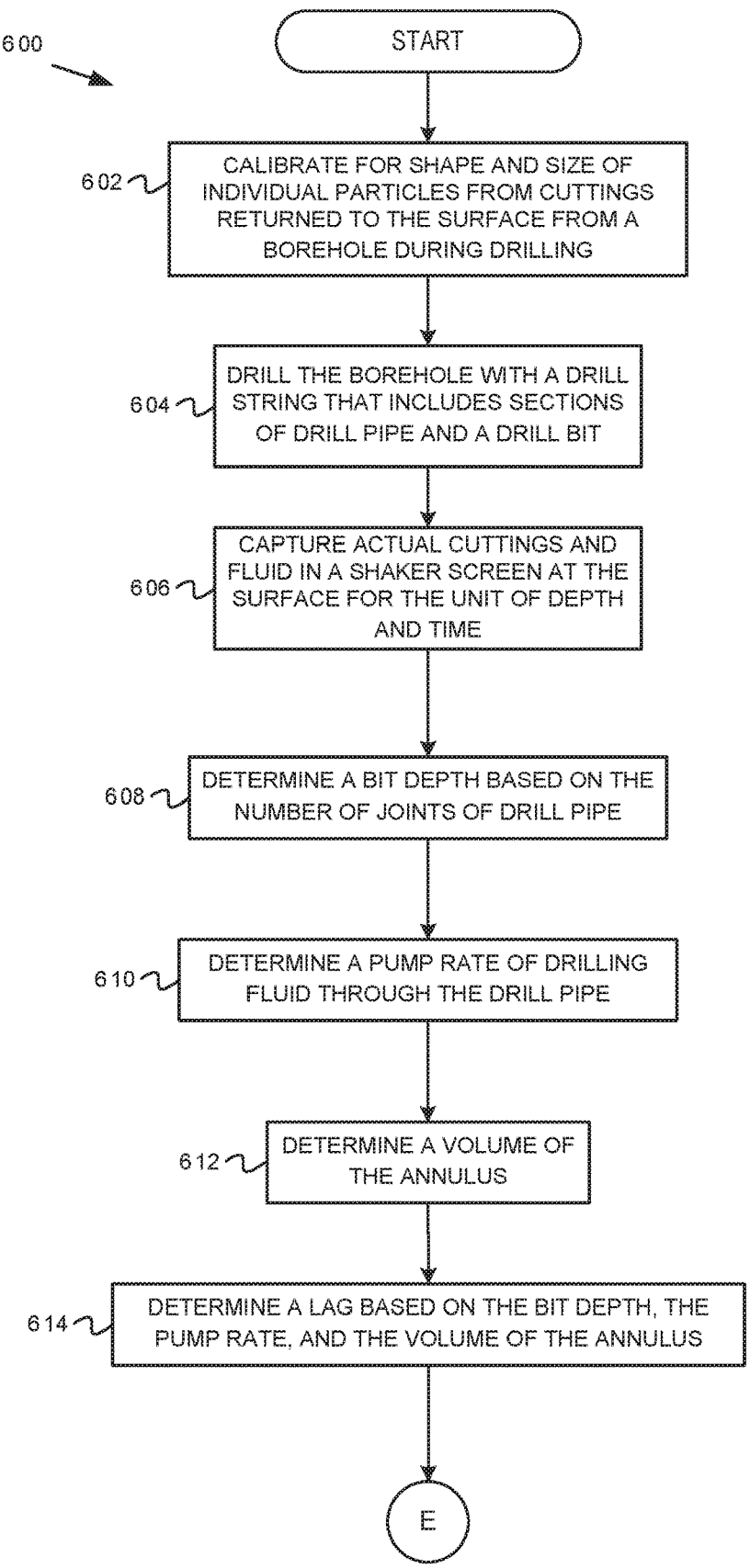
FIGS. 6-11 are flowcharts of operations for evaluating and possibly altering downhole drilling operations based on analysis of size and shape of particles in downhole cuttings, according to some embodiments.
Figure 7:
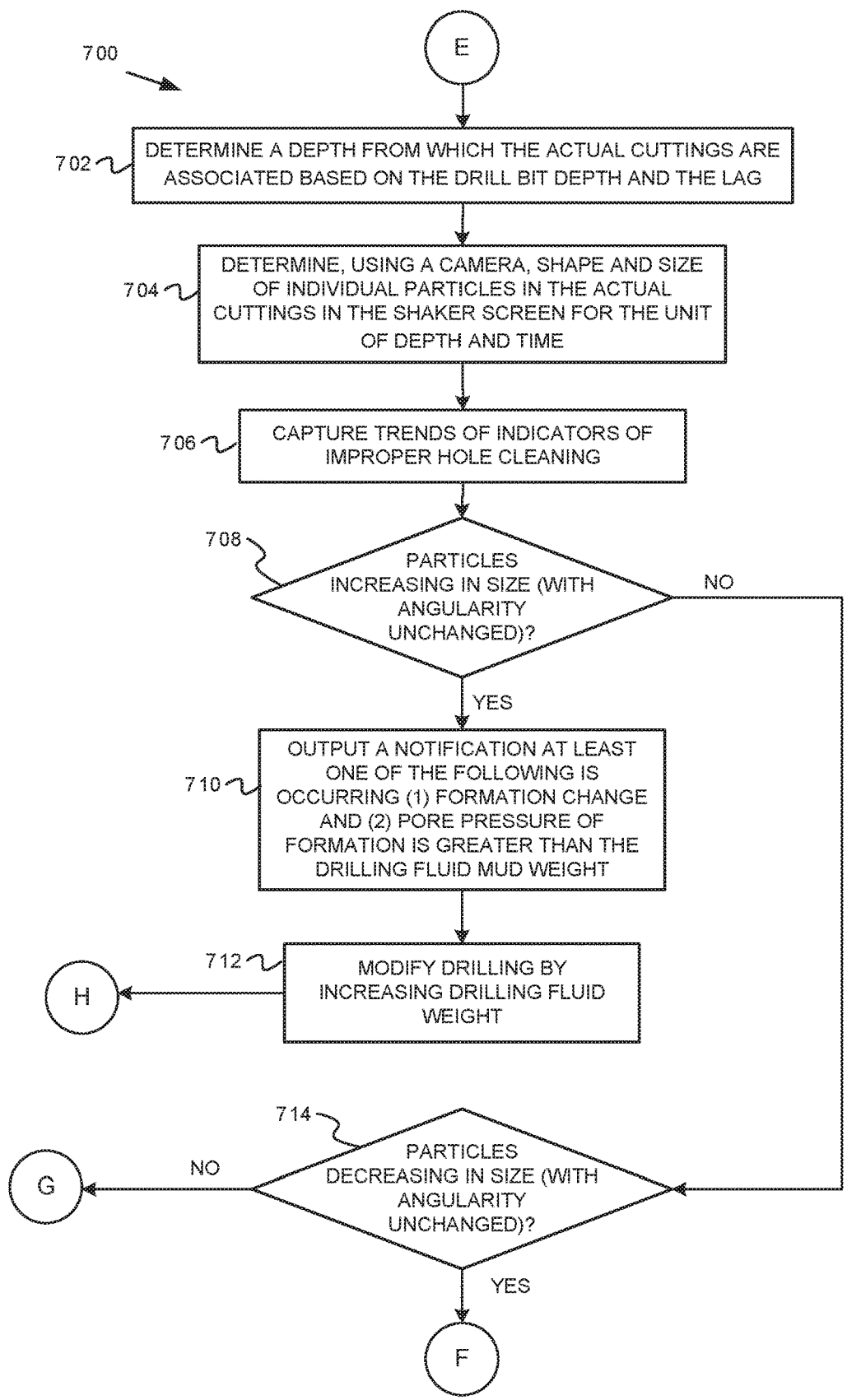
Figure 8:
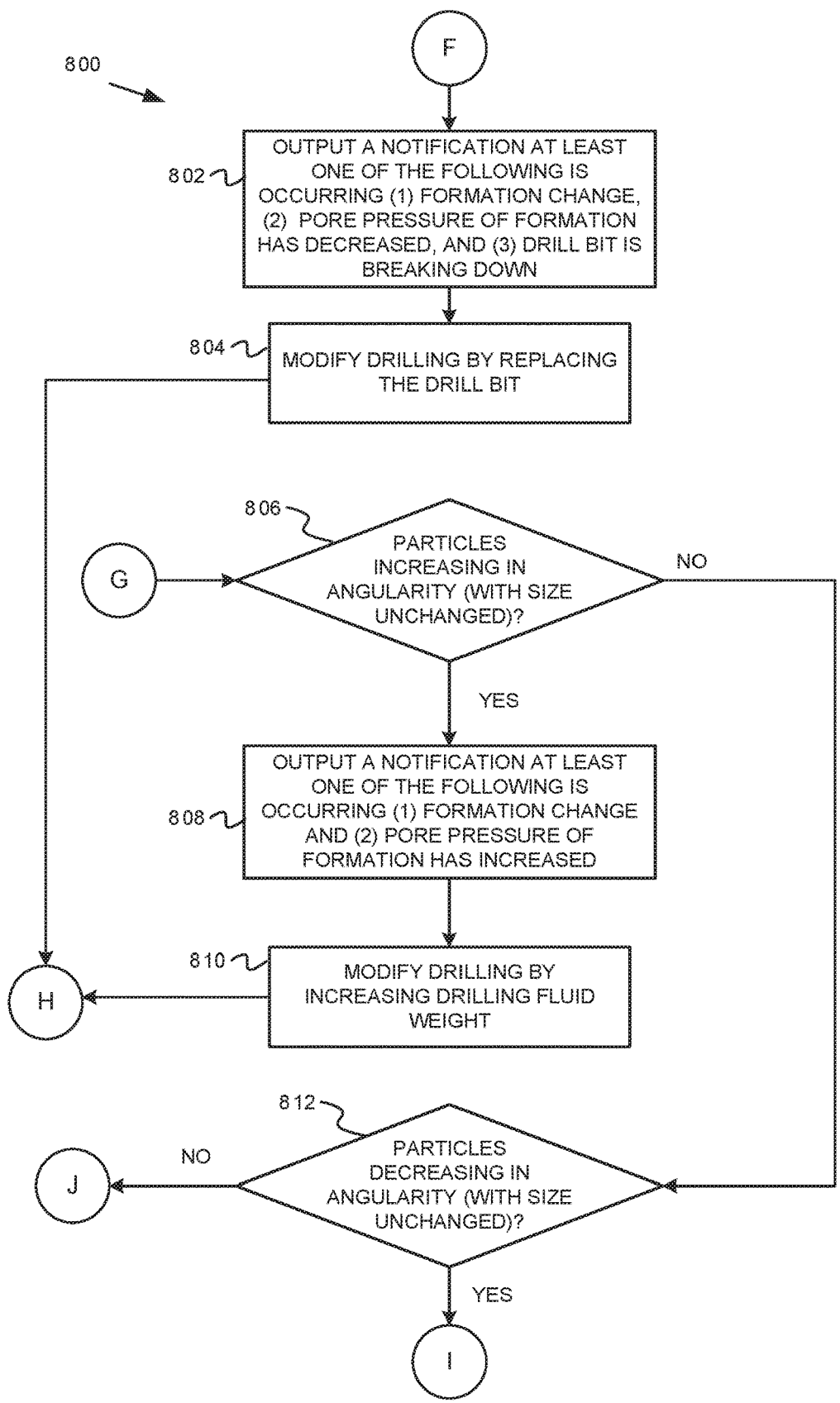
Figure 9:
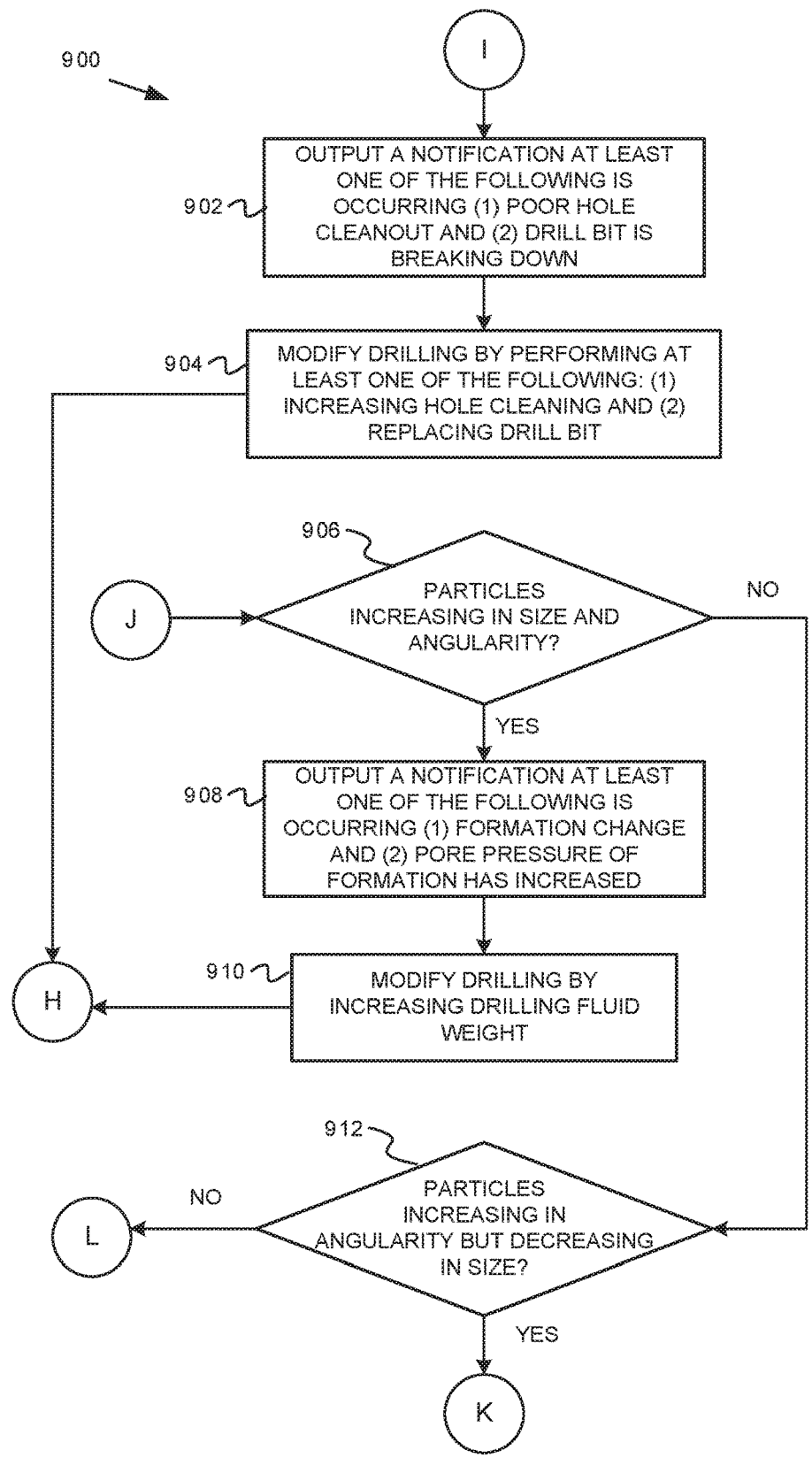
Figure 10:
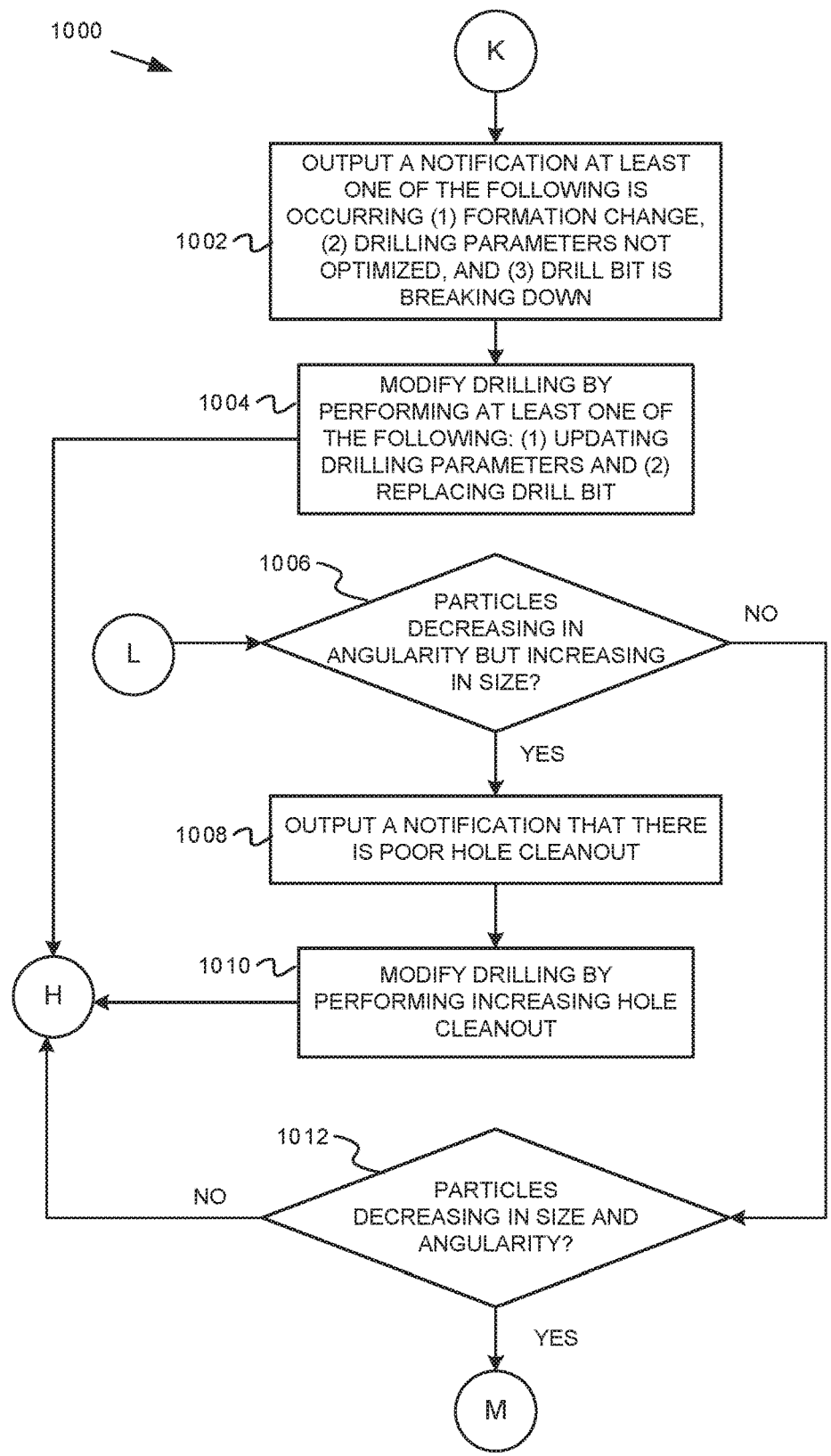
Figure 11:
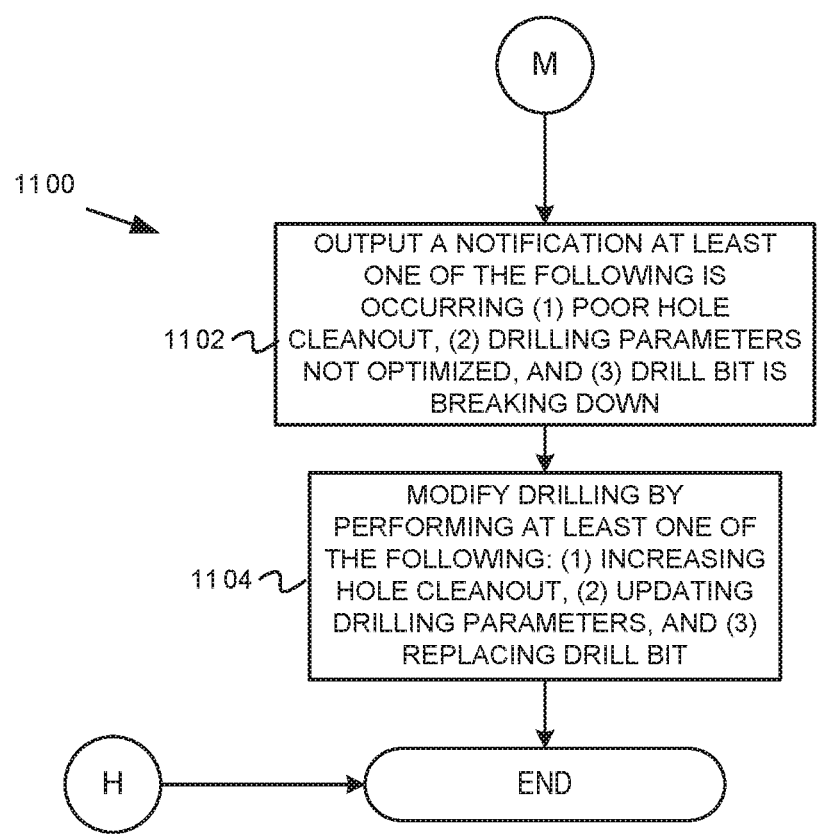
Figure 12:
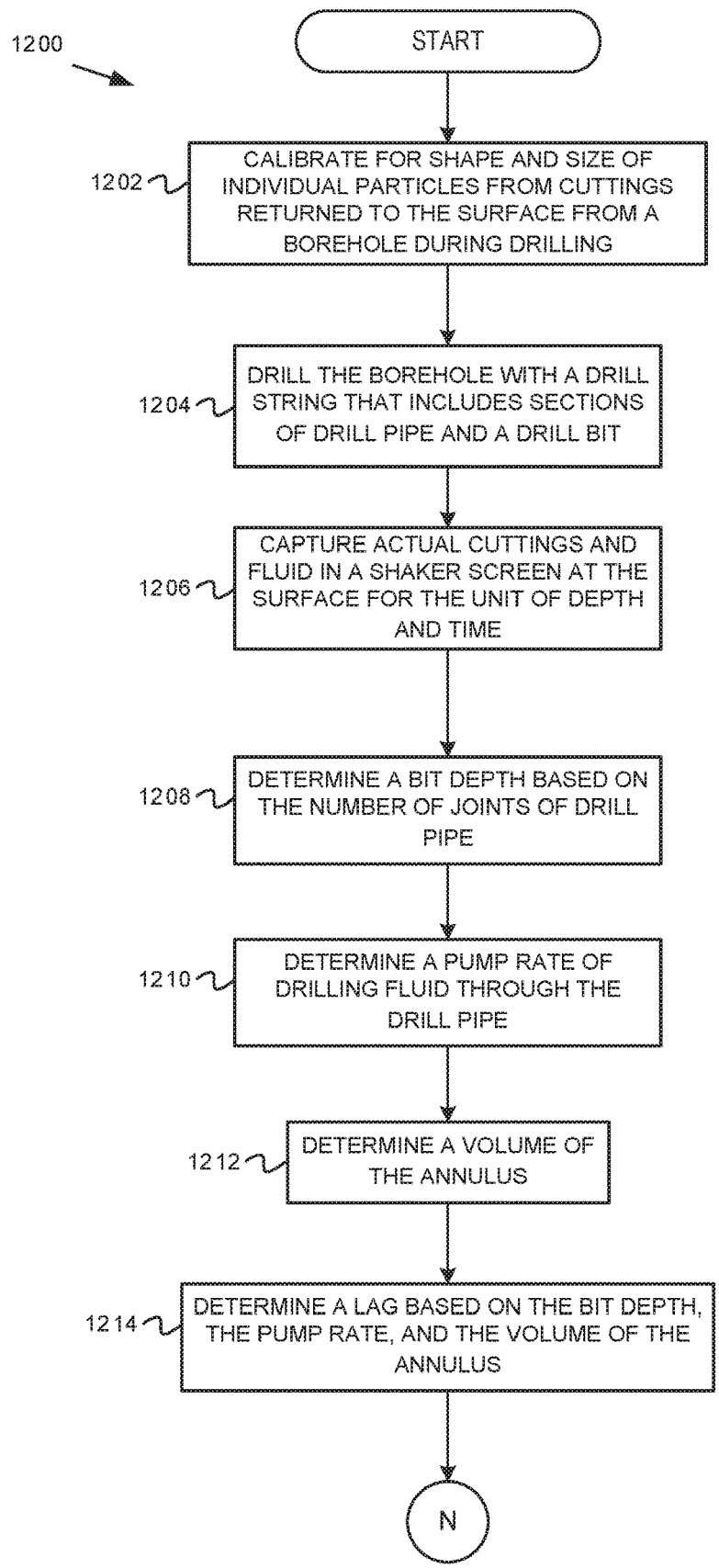
FIGS. 12-21 are flowcharts of operations for evaluating and possibly altering downhole drilling operations based on analysis of size and shape distributions of particles in downhole cuttings, according to some embodiments.
Figure 13:
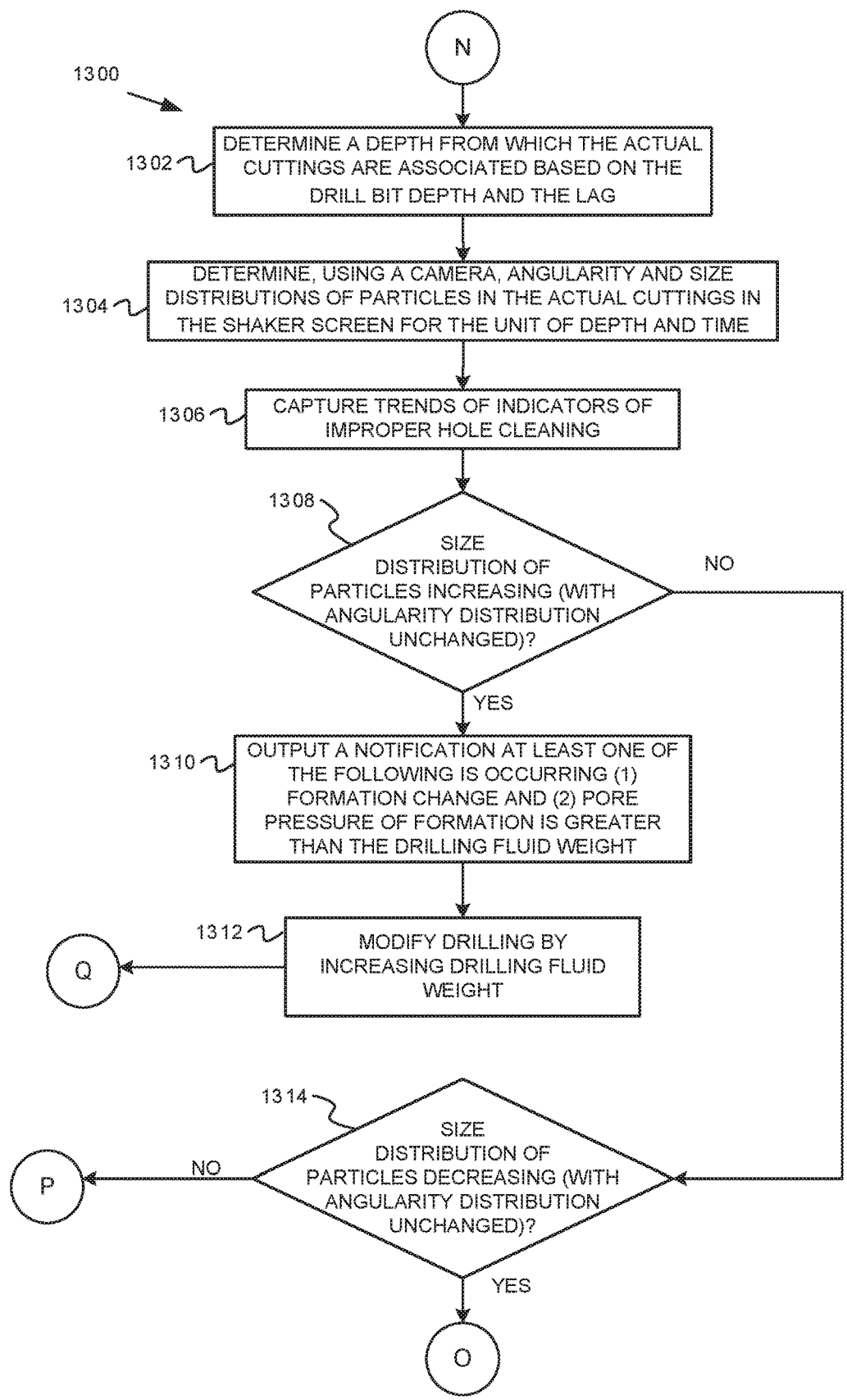
Figure 14:
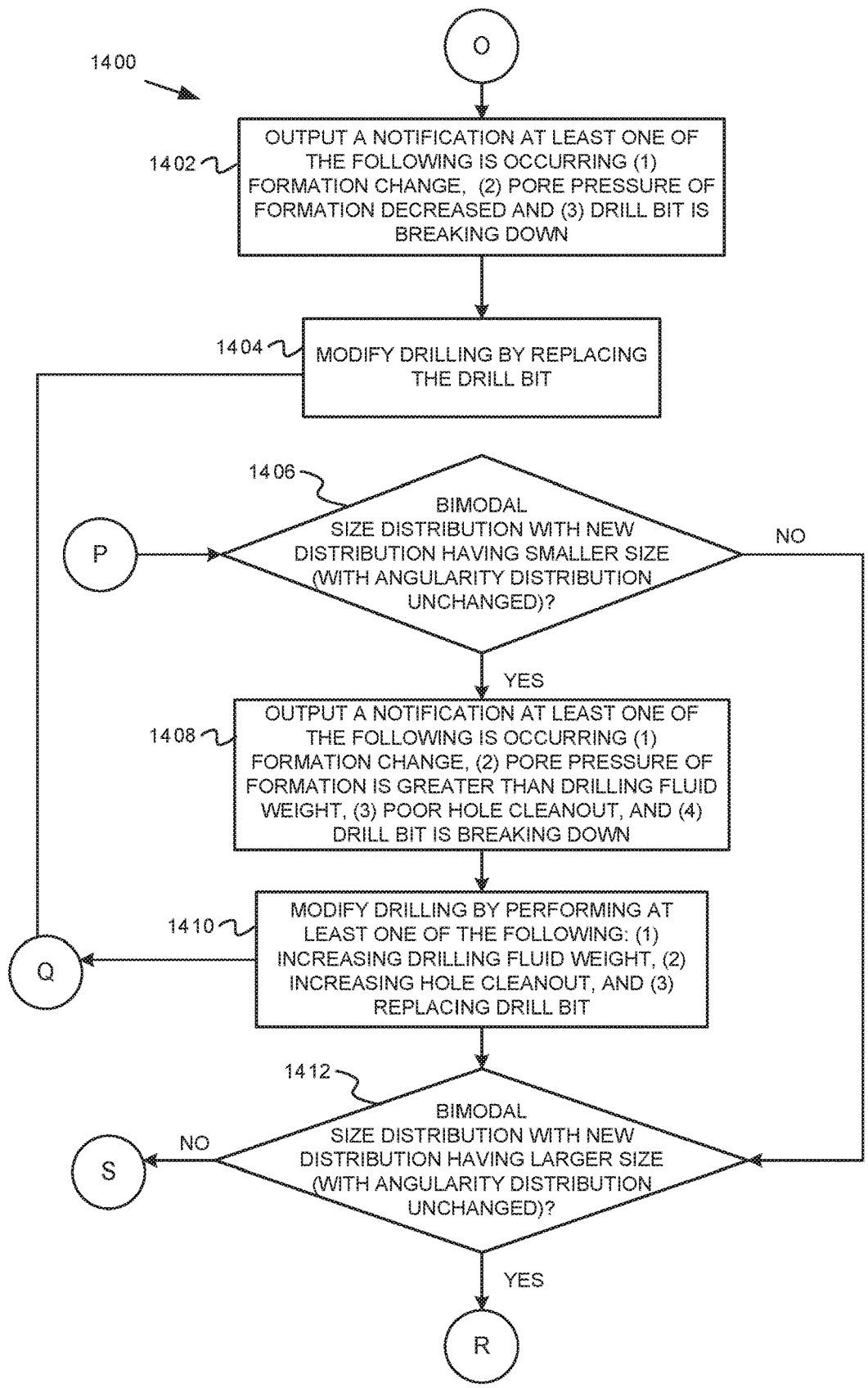
Figure 15:
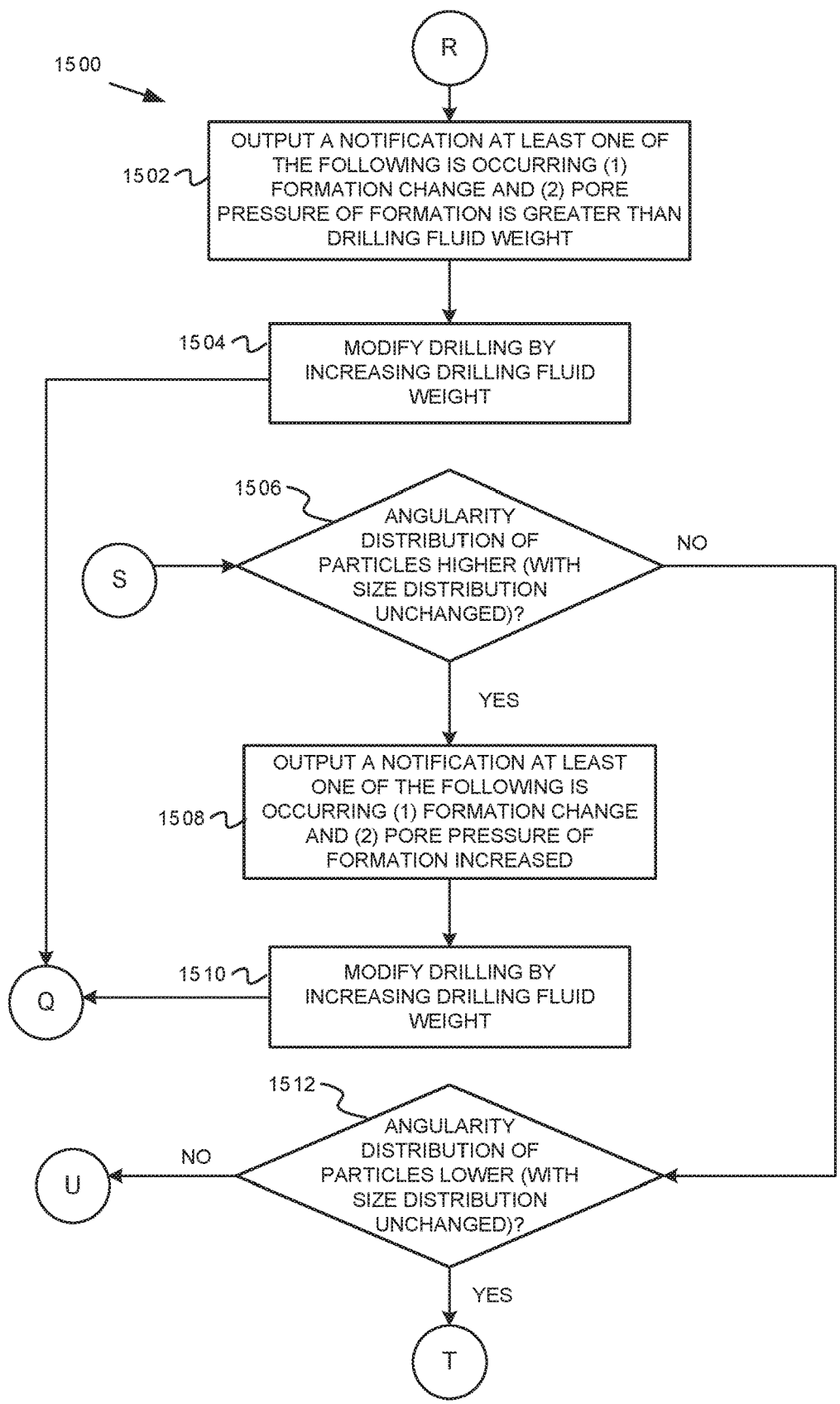
Figure 16:
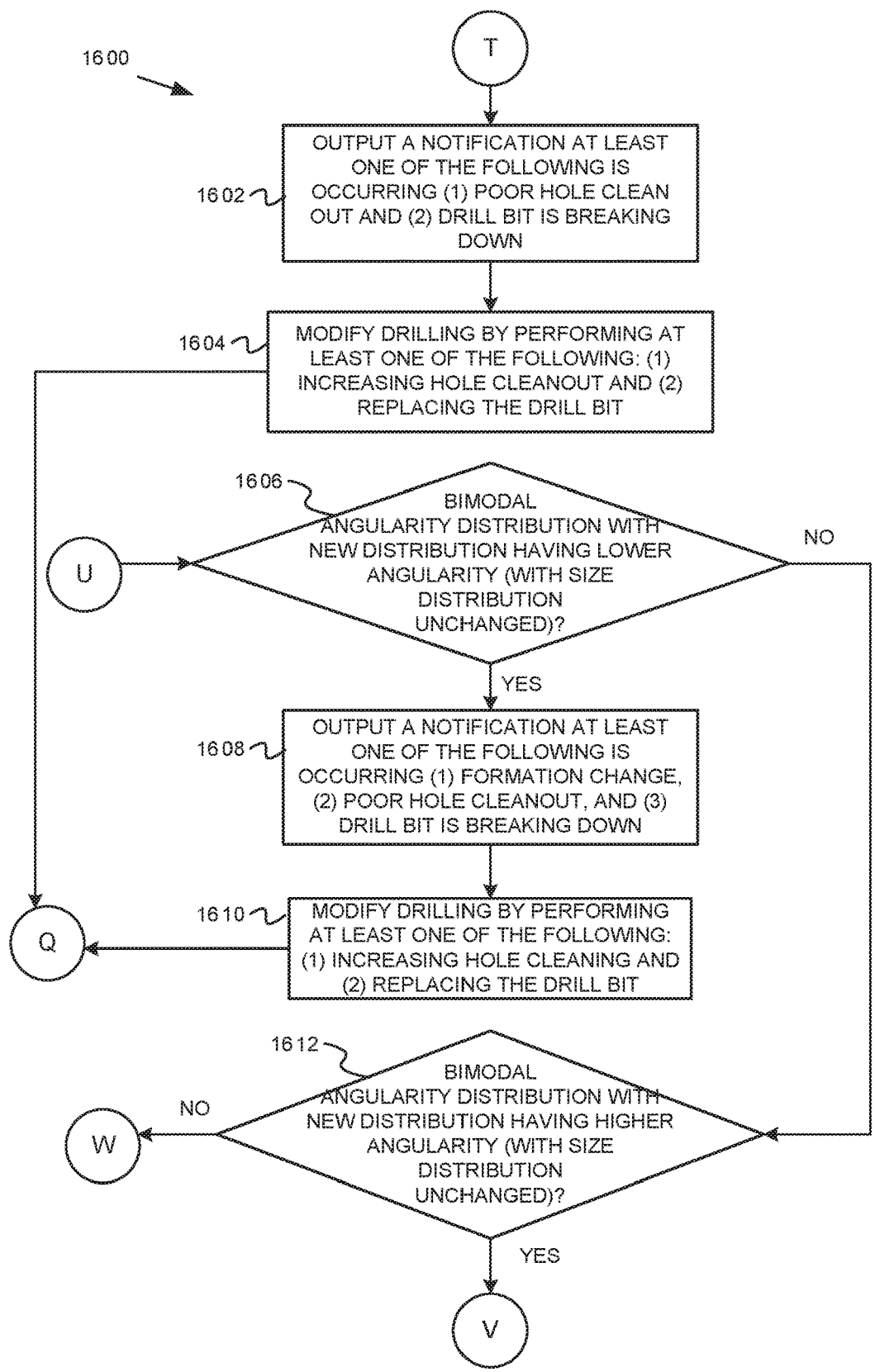
Figure 17:
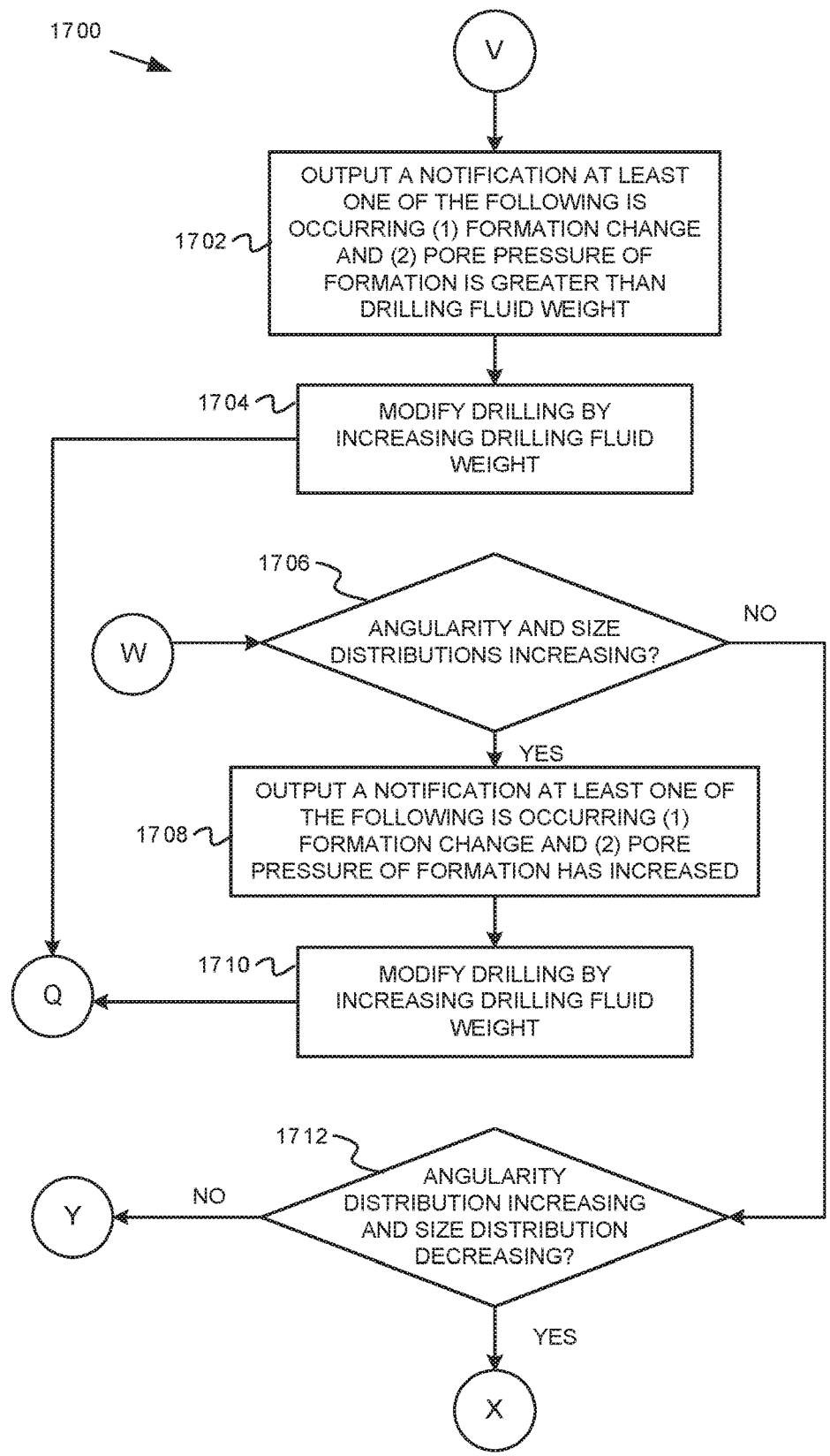
Figure 18:
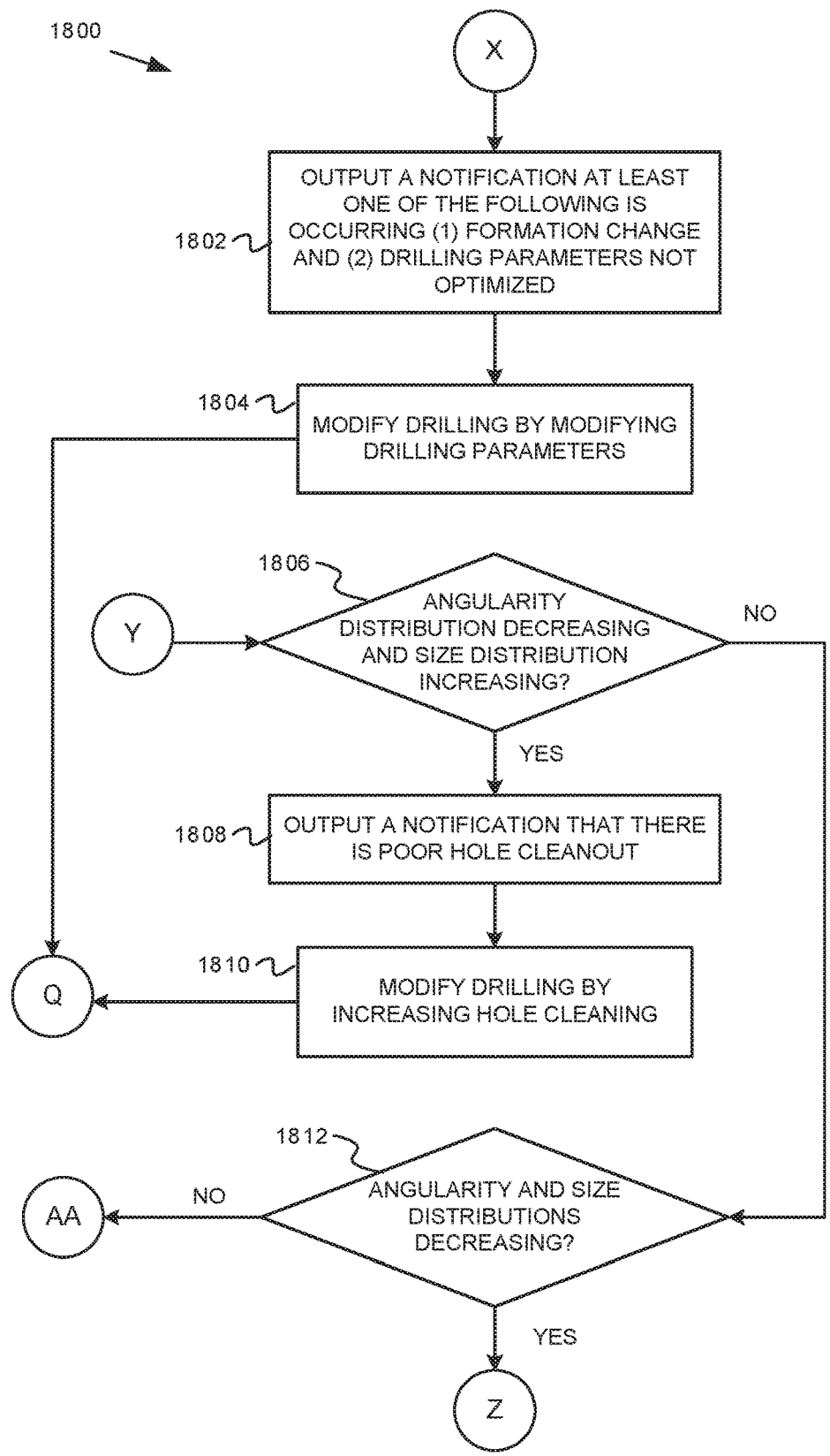
Figure 19:
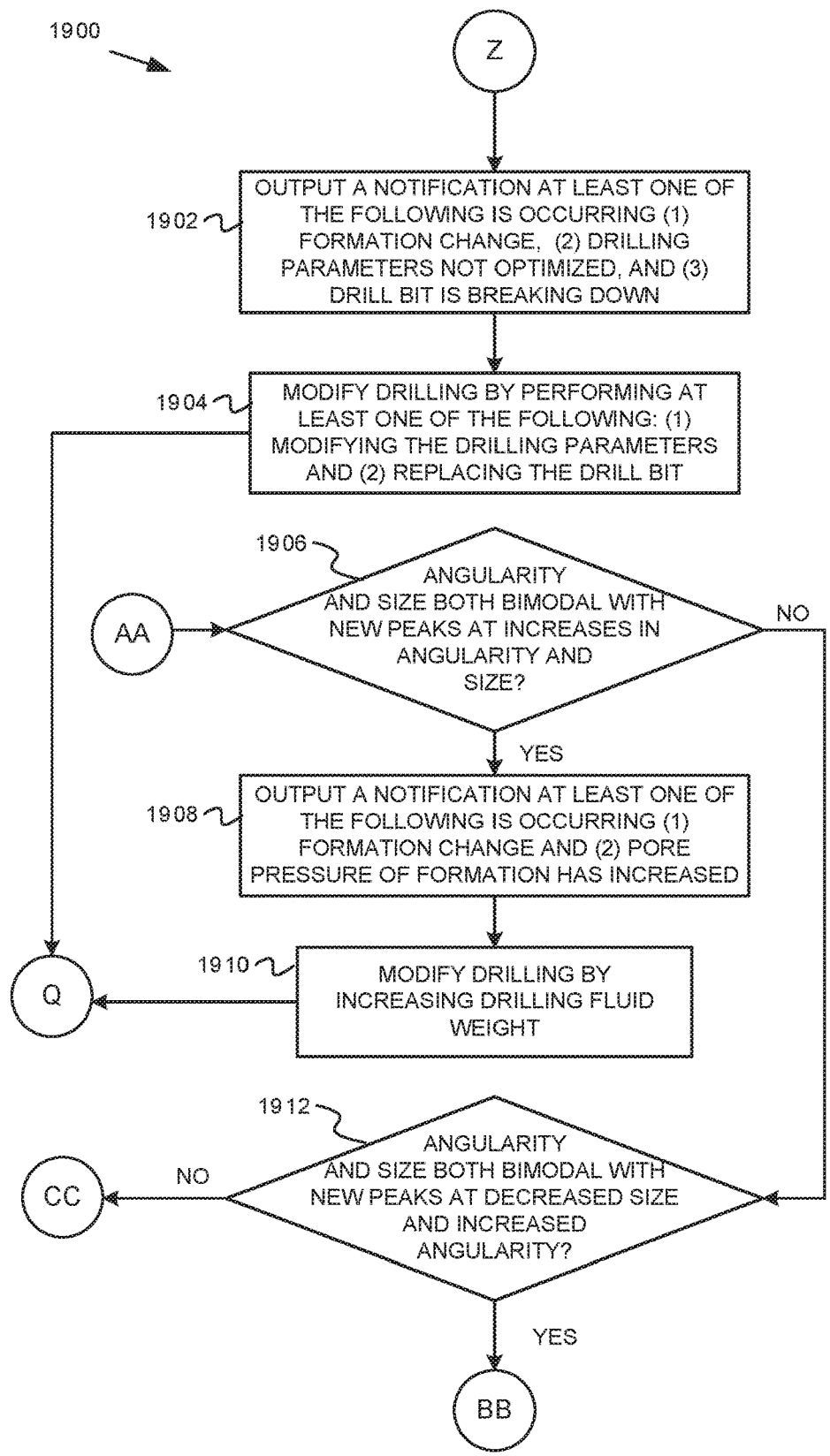
Figure 20:
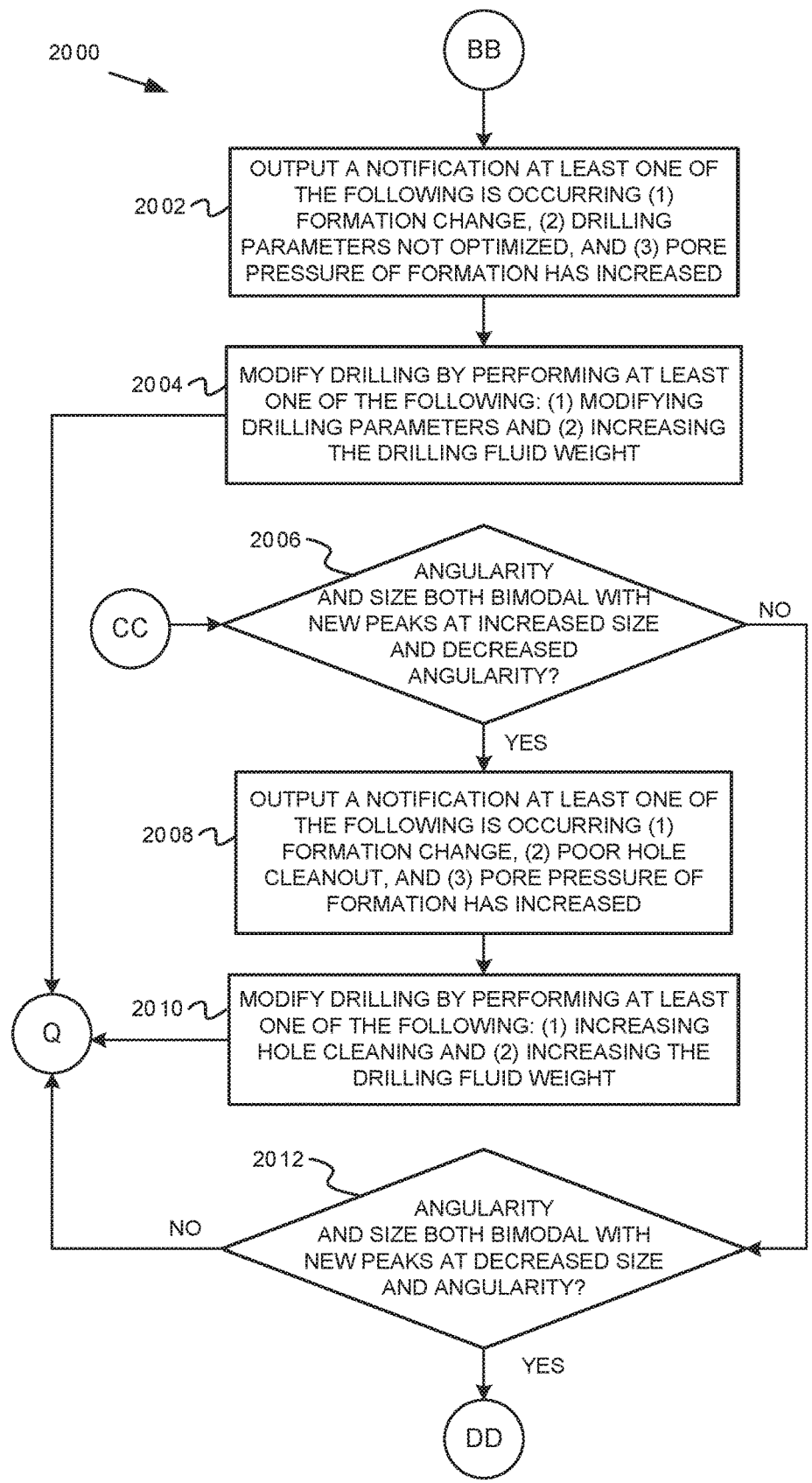
Figure 21:
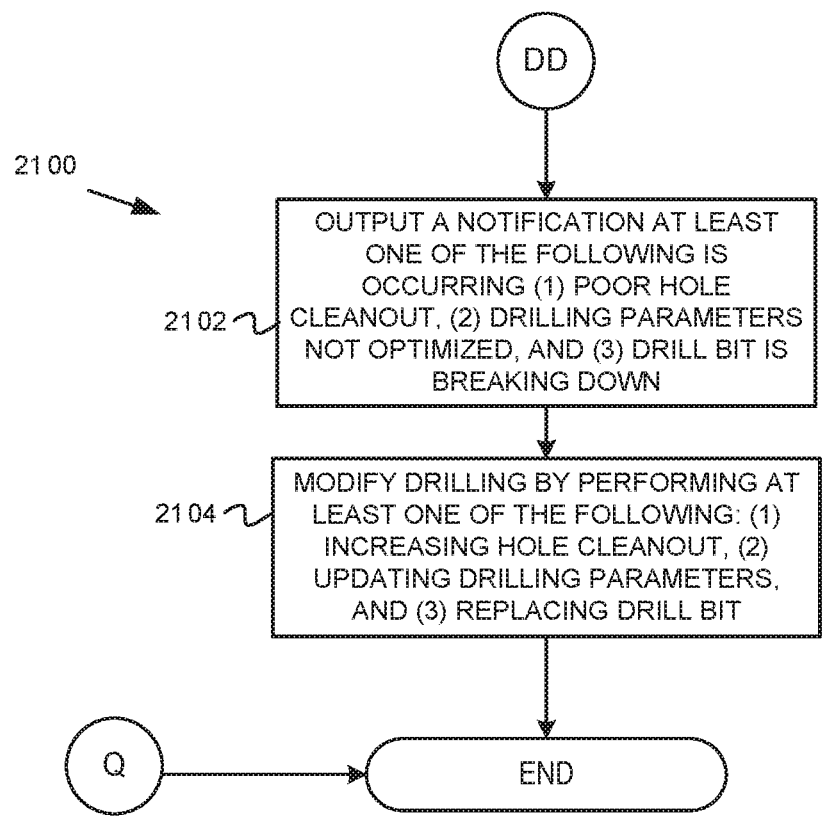

Example operations of analyzing and using the volume of cuttings is now described. FIGS. 3-5 are flowcharts of operations for evaluating and possibly altering downhole drilling operations based on analysis of volume of downhole cuttings, according to some embodiments. Operations of flowcharts 300-500 of FIGS. 3-5 continue among each other through transition points A-D. Operations of the flowcharts 300-500 can be performed by software, firmware, hardware or a combination thereof. The operations of the flowchart 300 start at block 302.

At block 302, a projected volume of cuttings projected to return to the surface during drilling of a borehole which is to be drilled for a unit of depth and time is determined. For example, with reference to FIGS. 1-2, the processors 130 calculate the projected volume of cuttings based on the determined unit of depth and time of drilling operations. The projected volume can also account for the size (e.g., diameter) of the drill bit 226 and/or reamer. The projected volume of cuttings for the determined depth and time interval may be calculated as a function of time.

At block 304, a borehole is drilled with a drill string that includes sections of drill pipe and a drill bit. For example, with reference to FIGS. 1-2, the drill bit 226 included on the bottommost portion of the drill string 208 drills the borehole 212. The drill string 208 includes one or more sections of drill pipe 218.

At block 306, actual cuttings and fluid are captured in a shaker screen for the unit of depth and time of drilling. For example, with reference to FIGS. 1-2, cuttings from the subsurface formation 214 are created during operation of the drill bit 226. Drilling fluid is used to remove the cuttings. The drilling fluid and cuttings are returned to the surface 204 during drilling of the borehole 212 for the determined unit of depth and time. The shaker screen 108 receives the drilling fluid which includes the cuttings. The drilling fluid may be filtered before or after it is received by the shaker screen 108 as to remove drilling fluid from the cuttings prior to analysis.

At block 308, a drill bit depth is determined based on the number of joints of drill pipe. The depth of the drill bit can be calculated if the number of joints of drill pipe and the lengths of each respective joint of drill pipe are known. For example, with reference to FIGS. 1-2, the depth of the drill bit 226 is determined based on the number of joints of drill pipe 218 and the known lengths of each of the drill pipe 218 joints.

At block 310, a pump rate of drilling fluid through the drill pipe is determined. The pump rate may be provided in pump strokes or volume of fluid pumped per minute. For example, with reference to FIGS. 1-2, the pump rate in addition to other drilling parameters may be stored in memory 150. The processors 130 may retrieve the pump rate from memory 150.

At block 312, a volume of the annulus is determined. For example, with reference to FIGS. 1-2, the processor 130 can calculate the volume of the annular area 240. The processor 130 may determine the volume based on the diameter of the borehole 212, diameter of the drill pipe 218, and the depth of the drill bit 226.

At block 314, a lag is determined based on the drill bit depth, pump rate, and volume of the annulus. The annular volume at the particular measured depth corresponding to the drill bit is determined based on the known drill bit depth and volume of the annulus. The lag can then be calculated using the resulting annular volume and the pump rate. For example, referring to FIGS. 1-2, the processors 130 can calculate the lag based on the depth of the drill bit 226, the volume of the annular area 240, and the pump rate of the mud pump 232. Operations of the flowchart 300 continue at transition point A, which continues at transition point A. of the flowchart 400. From transition point A of the flowchart 400, operations continue at block 402.

At block 402, a depth from which the actual cuttings are associated is determined based on the drill bit depth and the lag. The depth of the drill bit may be racked at each unit of depth and time. For instance, with reference to FIGS. 1-2, the processors 130 may retrieve from memory 150 the drill bit 226 depth recorded at the previous time which corresponds to the lag time. As an example, if the lag is determined to be 25 minutes and the current depth of the drill bit 226 is 5000 meters, the processor 130 may retrieve the drill bit 226 depth with a time stamp corresponding to 25 minutes prior.

At block 404, coherent electromagnetic radiation is emitted onto the actual cuttings in the shaker screen. For example, with reference to FIGS. 1-2, the lasers 190-192 emit coherent electromagnetic radiation onto the cuttings 112. The coherent electromagnetic radiation emitted onto the cuttings 112 can be visible as a line or curve, depending on the shape of the shaker screen.

At block 406, the velocity of the actual cuttings on the shaker is measured. The velocity of the cuttings may be determined using traditional approach of tracking a particle over a certain distance for a certain amount of time. For example, with reference to FIGS. 1-2, the imaging device 124 in conjunction with a velocity capture algorithm can be used to track the velocity of the particle/cuttings. Other methods using radars may also be used to determine velocity of particles. To titter out noise in the form of vibration of the shaker 104, a reference target can be mounted on a static portion of the shaker. The pixel movement can be captured using the imaging device 124. An algorithm may be selected to capture the pixel movement on the shaker 104. Other methods using accelerometers may also be used to baseline the vibrations on the shaker screen.

At block 408, a volume of the actual cuttings is measured for the unit of depth and time based on the coherent electromagnetic radiation emitted on the actual cuttings. For example, with reference to FIGS. 1-2, the line of coherent electromagnetic radiation deflects as a result of contacting the cuttings 112. The imaging device 124 captures an image of the line of coherent radiation. The processors 130 can analyze the captured image to determine the distance between the initial line and the deflection of the line resulting from contact with the cuttings 112. The resulting distance is used to determine the surface area of the cuttings 112. The surface area of the cuttings can be determined based on geometric relationships between known distances and/or thicknesses (e.g., with triangle properties). Volume of the cuttings can be obtained by multiplying the surface area of the cuttings (determined by laser deflection) and the velocity of cuttings passing over the laser line. The volume may also be determined by comparing the measured distance with distances previously measured for objects of a known thickness which are stored in memory 150 (e.g., in a lookup table). For instance, an object with a known thickness of 1.5 centimeters (cm) can be used during calibration to determine the distance of deflection resulting from an object with a thickness of 1.5 cm. The distance may be stored in a lookup table in memory 150. When obtaining the volume of the cuttings 112, the processors 130 can identify whether the current measured distance has been stored in the lookup table (e.g., to determine if particles have a thickness of 1.5 cm). Programs which facilitate particle analysis (e.g., particle size analysis software, three-dimensional facial recognition software, etc.) may also be leveraged when determining volume. The discrete and/or cumulative volume of cuttings for the current interval of depth and/or time which are determined based on analysis of the line of coherent electromagnetic radiation may be stored in the memory 150.

At block 410, it is determined whether the difference between the measured volume and the projected volume exceeds an error threshold. The error threshold indicates a deviation of the projected volume from the measured volume which can be attributed to error. The error threshold can account for drilling fluid which remains on cuttings after the cuttings are returned to the surface and deposited on the shaker screen. For instance, with reference to FIGS. 1-2, cuttings 112 which contain remnants of drilling fluid may be deposited onto the shaker screen 108. The drilling fluid which remains at the time of analysis of the cuttings 112 contributes to error of measurement and is thus accounted for in the error threshold. The processors 130 can determine whether the error threshold is exceeded after calculating the difference between the measured volume and projected volume.

At block 412, if the difference between the measured volume and the projected volume does not exceed the error threshold, the current parameters for drilling are maintained. A difference between the measured volume of and the projected volume of cuttings, discrete or cumulative, which exceeds the error threshold indicates that current drilling parameters are maintaining formation stability and safe conditions. For example, with reference to FIGS. 1-2, drilling of the borehole 212 with the drill bit 226 and/or reamer will be maintained with the current set of parameters, such as the drilling fluid weight. Operations of the flowchart 400 continue at transition point D, which continues at transition point D of the flowchart 500. From transition point D of the flowchart 500, operations are complete.

At block 414, if the difference between the measured volume and the projected volume exceed the error threshold, trends of other indicators of improper hole cleaning are captured. Other indicators of improper hole cleaning include changes in torque, drag, equivalent circulating density, and standpipe pressure. For instance, with reference to FIGS. 1-2, the processors 130 can obtain improper hole cleaning indicator data over a unit of depth and/or time for storage in memory 150. For example, the processors 130 may obtain current drilling parameters, mud weight, depth of the drill bit 226, etc. Data obtained for the time or depth interval can be input into calculations for determining values of the indicators (e.g., by calculating standpipe pressure). The combination of such indicators may be combined to create a positive indicator for improper hole cleaning.

At block 416, it is determined whether the measured volume is less than the projected volume. For example, with reference to FIGS. 1-2, the processors 130 may make the determination based on comparison of the measured volume and the projected volume. If the measured volume is greater than the projected volume, operations of the flowchart 400 continue at transition point B, which continues at transition point B of the flowchart 500. From transition point B of the flowchart 500, operations continue at block 504.

At block 418, if the measured volume is less than the projected volume, a notification or alarm is output. For instance, with reference to FIGS. 1-2, the processors 130 can generate the notification or alarm which is output to the display 196. The notification or alarm could indicate that a cuttings buildup is occurring downhole. This information, when coupled with information such as changes in torque, drag, equivalent circulating density, standpipe pressure, etc., can lead to a positive indicator for improper borehole cleaning. A buildup of cuttings indicates that hole cleaning efforts should increase. Poor hole cleaning could lead to pack off, increased bottom hole pressure, and/or possible formation fracture. The notification or alarm could also indicate that the drill bit and/or reamer has reduced in diameter. Reduction of the diameter of the drill bit and/or reamer may lead to bit trip. Operations of the flowchart 400 continue at transition point C, which continues at transition point C of the flowchart 500. From transition point C of the flowchart 500, operations continue at block 502.

At block 502, drilling is modified by increasing hole cleaning and/or replacing the reamer and/or drill bit. Hole cleaning may be increased due to receipt of a notification that a buildup of cuttings is occurring downhole. Additionally, the drill bit and/or reamer may be replaced as a result of receiving a notification that the drill bit and/or reamer has reduced in diameter. For example, with reference to FIGS. 1-2, the drill bit 226 is replaced to resolve the reduction in diameter resulting from drilling of the borehole 212. Cleaning of the borehole 212 may also be increased if cuttings from the subsurface formation 214 have built up in the borehole. Cleaning of the borehole 212 may be increased by adjusting the properties of the drilling fluid, increasing the flow rate, altering the penetration rate, etc.

At block 504, if the measured volume is greater than the projected volume, a notification or alarm is output. For instance, with reference to FIGS. 1-2, the processors 130 can generate the notification or alarm which is output to the display 196. The notification or alarm could indicate that the hole is collapsing and that mitigating efforts should be taken to stabilize the wellbore. The notification or alarm could also indicate that the pore pressure has surpassed the drilling fluid weight.

At block 506, drilling is modified by increasing the drilling fluid weight. Drilling fluid weight should be increased as a result of identifying that the formation pore pressure is greater than the drilling fluid weight. For example, with reference to FIGS. 1-2, the density of the drilling fluid pumped from the mud pit 234 downhole can be increased (e.g., through addition of barite).

Size and Shape-Based Analysis Operations of Downhole Drill Cuttings

In some embodiments, a size and/or shape of the cuttings can be determined and used. The use of these determined size and/or shape of the cuttings can be in place of or in addition to the operations above that are based on volume of the cuttings described above with reference to FIGS. 3-5.

FIGS. 6-11 are flowcharts of operations for evaluating and possibly altering downhole drilling operations based on analysis of size and shape of particles in downhole cuttings, according to some embodiments. Operations of flowcharts 600-1100 of FIGS. 6-11 continue among each other through transition points E-M. Operations of the flowcharts 600-1100 can be performed by software, firmware, hardware or a combination thereof. The operations of the flowchart 600 start at block 602.

At block 602, shape and size of individual particles from cuttings returned to the surface from a borehole during drilling are calibrated for. Calibration of particle analysis can be performed with items of a known size and shape. For instance, with reference to FIGS. 1-2, the imaging device 124 focuses on the cuttings 112. Calibration may occur when the cuttings 112 are on the shaker 104 itself or when the cuttings are on another flat surface with the same focal length. Size and shape data can be communicated to the workstation 156, The lasers 190 and/or 192 may be used to mark known sizes and/or shapes on the shaker 104. Shape and/or size can be determined using the lasers 190 and/or 192 through analysis of the laser line deflection caused by the height of objects in the path of the laser line. Shapes and/or sizes determined through analysis of the laser line deflection can be stored in memory 150. When performing size and shape-based analysis of cuttings from downhole, size can be used in addition to or in place of volume. Size is a two-dimensional measurement of a single cutting and is proportional to change in volume that is a three-dimensional measurement. Shape changes can be defined as changes in angularity. The smaller the angle, the higher the angularity (e.g., a cube). Similarly, the larger the angle, the less angularity (e.g., a sphere).

At block 604, a borehole is drilled with a drill string that includes sections of drill pipe and a drill bit. For example, with reference to FIGS. 1-2, the drill bit 226 included on the bottommost portion of the drill string 208 drills the borehole 212. The drill string 208 includes one or more sections of drill pipe 218.

At block 606, actual cuttings and fluid are captured in a shaker screen for the unit of depth and time of drilling. For example, with reference to FIGS. 1-2, cuttings from the subsurface formation 214 are created during operation of the drill bit 226 for the determined interval of depth and time. Drilling fluid is used to remove the cuttings. The drilling fluid and cuttings are returned to the surface 204 and deposited onto the shaker screen 108. The drilling fluid may be filtered before or after it is received by the shaker screen 108 as to remove drilling fluid from the cuttings prior to analysis.

At block 608, a drill bit depth is determined based on the number of joints of drill pipe. The depth of the drill bit can be calculated if the number of joints of drill pipe and the lengths of each respective joint of drill pipe are known. For example, with reference to FIGS. 1-2, the depth of the drill bit 226 is determined based on the number of joints of drill pipe 218 and the known lengths of each of the drill pipe 218 joints.

At block 610, a pump rate of drilling fluid through the drill pipe is determined. The pump rate may be provided in pump strokes or volume of fluid pumped per minute. For example, with reference to FIGS. 1-2, the pump rate in addition to other drilling parameters may be stored in memory 150. The processors 130 may retrieve the pump rate from memory 150.

At block 612, a volume of the annulus is determined. For example, with reference to FIGS. 1-2, the processors 130 can calculate the volume of the annular area 240. The processors 130 may determine the volume based on the diameter of the borehole 212, diameter of the drill pipe 218, and the depth of the drill bit 226.

At block 614, a lag is determined based on the drill bit depth, pump rate, and volume of the annulus. The annular volume at the particular measured depth corresponding to the drill bit is determined based on the known drill bit depth and volume of the annulus. The lag can then be calculated using the resulting annular volume and the pump rate. For example, referring to FIGS. 1-2, the processors 130 can calculate the lag based on the depth of the drill bit 226, the volume of the annular area 240, and the pump rate of the mud pump 232. Operations of the flowchart 600 continue at transition point E, which continues at transition point E of the flowchart 700. From transition point E of the flowchart 700, operations continue at block 702.

At block 702, a depth from which the actual cuttings are associated is determined based on the drill bit depth and the lag. The depth of the drill bit may be tracked at each unit of depth and time. For instance, with reference to FIGS. 1-2, the processors 130 may retrieve from memory 150 the drill bit 226 depth recorded at the previous time which corresponds to the lag time. As an example, if the lag is determined to be 25 minutes and the current depth of the drill bit 226 is 5000 meters, the processor 130 may retrieve the drill hit 226 depth with a time stamp corresponding to 25 minutes prior. The previous depth of the drill bit 226 can then be determined to correspond to the depth from which the cuttings 112 are associated.

At block 704, the shape and size of individual particles in the actual cuttings in the shaker screen for the unit of depth and time are determined with a camera. For example, with reference to FIGS. 1-2, images of the cuttings 112 may be recorded with the imaging device 124. The processors 130 may analyze the received images to determine corresponding shape and size data. The shape and size in the form of data and/or photographs may be stored onsite or offsite in memory 150.

At block 706, trends of indicators of improper hole cleaning are captured. Indicators of improper hole cleaning include changes in torque, drag, equivalent circulating density, and standpipe pressure. For instance, with reference to FIGS. 1-2, the processors 130 can obtain improper hole cleaning indicator data over a unit of depth and/or time for storage in memory 150. For example, the processors 130 may obtain current drilling parameters, mud weight, depth of the drill bit 226, etc. Data obtained for the time or depth interval can be input into calculations for determining values of the indicators. The combination of such indicators may be combined to create a positive indicator for improper hole cleaning.

At block 708, it is determined if the particles are increasing in size with unchanged angularity. For example, with reference to FIGS. 1-2, the processors 130 may compare the shape and size data collected for the cuttings 112 currently present in the shaker screen 108 with previously acquired shape and size data stored in memory 150. Particle sizes recorded from the previous unit of depth and time of drilling may be compared to the cuttings 112 to identify if the size is increasing. Similarly, particle angularity recorded during the previous unit of depth and time of drilling may be compared to the observed angularity of the cuttings 112 to identify if the angularity is unchanged. A threshold size and/or angularity change may be enforced which should be satisfied to determine that the observed changes are sufficiently significant to quantify as an increase or decrease. For instance, a size change threshold may be set at 5 square microns ($\mu m^2$). An observed size increase of 10 $\mu m^2$ therefore may be considered an increase in size due to satisfying the size change threshold. When particle size increases with no change in angularity, it may be assumed that the formation has changed and that the pore pressure of the formation has reduced or has increased relative to the drilling fluid weight. It may also be assumed that the formation has changed and/or the drill bit 226 is breaking down (e.g., wearing out) and is no longer fully functional.

At block 710, if particles are increasing in size with unchanged angularity, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure has surpassed the drilling fluid weight.

At block 712, drilling is modified by increasing the weight of drilling fluid. For example, with reference to FIGS. 1-2, the density of the drilling fluid pumped from the mud pit 234 downhole can be increased (e.g., through addition of barite or other additives). Operations of the flowchart 700 continue at transition point H, which continues at transition point H of the flowchart 1100. From transition point H of the flowchart 1100, operations are complete.

At block 714, if particles are not decreasing in size or changing in angularity, it is determined if the particles are decreasing in size with no change in angularity. For example, with reference to FIGS. 1-2, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is decreasing. Similarly, particle angularity recorded during the previous unit of depth and time of drilling may be compared to the observed angularity of the cuttings 112 to identify if the angularity is unchanged. A threshold size and/or angularity change may be enforced which should be satisfied to determine that the observed changes are sufficiently significant to quantify as an increase or decrease. When the size of particles decreases and angularity is unchanged, it may be assumed that the formation has changed and/or that the pore pressure of the formation has decreased. It may also be assumed that the drill bit is breaking down and is no longer fully functional.

If particles are decreasing in size with unchanged angularity, operations of the flowchart 700 continue at transition point F, which continues at transition point F of the flowchart 800. From transition point F of the flowchart 800, operations continue at block 802. If particles are not decreasing in size with unchanged angularity, operations of the flowchart 700 continue at transition point G, which continues at transition point G of the flowchart 800. From transition point G of the flowchart 800, operations continue at block 806.

At block 802, a notification or alarm is output. For instance, with reference to FIGS. 1-2, the processors 130 can generate the notification or alarm which is output to the display 196. The notification or alarm may indicate that a formation change is occurring. The notification or alarm could also indicate that the pore pressure of the formation has increased. The notification or alarm could also indicate that the drill bit is breaking down.

At block 804, drilling is modified by replacing the drill bit. For instance, with reference to FIGS. 1-2, after determining that the drill hit 226 is breaking down, the drill bit 226 may be replaced for subsequent drilling operations.

At block 806, it is determined if particles are increasing in angularity with size unchanged. For example, with reference to FIGS. 1-2, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is unchanged. Similarly, particle angularity recorded during the previous unit of depth and time of drilling may be compared to the observed angularity of the cuttings 112 to identify if the angularity is increasing. A threshold size and/or angularity change may be enforced which should be satisfied to determine that the observed changes quantify as an increase or decrease. For instance, a threshold angularity change may indicate a difference between particle shapes which should be observed in order to determine that an increase or decrease in angularity has occurred. When the angularity of particles increases and size is unchanged, it may be assumed that the formation has changed and the pore pressure of the formation is increased.

At block 808, if particles are increasing in angularity with size unchanged, a notification or alarm is output. For instance, with reference to FIGS. 1-2, the processors 130 can generate the notification or alarm which is output to the display 196. The notification or alarm may indicate that a formation change is occurring. The notification or alarm may also indicate that the pore pressure of the formation has increased.

At block 810, drilling is modified by increasing the weight of drilling fluid. For example, with reference to FIGS. 1-2, the density of the drilling fluid pumped from the mud pit 234 downhole can be increased (e.g., through addition of barite). Operations of the flowchart 800 continue at transition point H, which continues at transition point H of the flowchart 1100. From transition point H of the flowchart 1100, operations are complete.

At block 812, if particles are not increasing in angularity with size unchanged, it is determined if particles are decreasing in angularity with size unchanged. For example, with reference to FIGS. 1-2, the processors 130 may compare the shape and size data collected for the cuttings 112 currently present in the shaker screen 108 with previously acquired shape and size data stored in memory 150. Particle sizes recorded at the previous unit of depth and time of drilling may be compared to the cuttings 112 to identify if the size is unchanging. Similarly, particle angularity recorded during the previous unit of depth and time of drilling may be compared to the observed angularity of the cuttings 112 to identify if the angularity is decreasing. A threshold size and/or angularity change may be enforced which should be satisfied to determine that the observed changes quantify as an increase or decrease. If a decrease in particle angularity without a change in size is observed, it may be determined that the hole cleanout is poor (i.e., cuttings are not returning to the surface). It may also be determined that the drill bit 226 is breaking down.

If particles are decreasing in angularity with unchanged size, operations of the flowchart 800 continue at transition point I, which continues at transition point I of the flowchart 900. From transition point I of the flowchart 900, operations continue at block 902. If particles are not decreasing in angularity with size unchanged, operations of the flowchart 800 continue at transition point J, which continues at transition point J of the flowchart 900. From transition point J of the flowchart 900, operations continue at block 906.

At block 902, a notification or alarm is output. For instance, with reference to FIGS. 1-2, the processors 130 can generate the notification or alarm which is output to the display 196. The notification or alarm may indicate that hole cleanout is poor. The notification or alarm may also indicate that the drill bit 226 is breaking down.

At block 904, drilling is modified by increasing hole cleaning and/or replacing the drill bit. For instance, with reference to FIGS. 1-2, the drill bit 226 is replaced for subsequent drilling operations. Cleanout of the borehole 212 may be increased by increasing flow rate of drilling fluid, adjusting drilling fluid properties, etc. Operations of the flowchart 900 continue at transition point H, which continues at transition point H of the flowchart 1100. From transition point H of the flowchart 1100, operations are complete.

At block 906, it is determined if particles are increasing in size and angularity. For example, with reference to FIGS. 1-2, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is increasing. Similarly, particle angularity recorded during the previous unit of depth and time of drilling may be compared to the observed angularity of the cuttings 112 to identify if the angularity is increasing. A threshold size and/or angularity change may be enforced which should be satisfied to determine that the observed changes quantify as an increase or decrease. For instance, a threshold angularity change may indicate a difference between particle shapes which should be observed in order to determine that an increase in angularity has occurred. An increase in both size and angularity may indicate that the formation has changed and/or that the pore pressure of the formation has increased.

At block 908, if particles are increasing in size and angularity, a notification or alarm is output. The notification or alarm may indicate that a change in the formation is occurring. The notification or alarm may also indicate that the pore pressure of the formation has increased. For instance, with reference to FIGS. 1-2, the processors 130 can generate the notification or alarm which is output to the display 196.

At block 910, drilling is modified by increasing the weight of drilling fluid. For example, with reference to FIGS. 1-2, the density of the drilling fluid pumped from the mud pit 234 downhole can be increased (e.g., through addition of barite or another additive)). Operations of the flowchart 900 continue at transition point H, which continues at transition point H of the flowchart 1100. From transition point H of the flowchart 1100, operations are complete.

At block 912, if particles are not increasing in size and angularity, it is determined if particles are increasing in angularity and decreasing in size. For example, with reference to FIGS. 1-2, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is decreasing. Similarly, particle angularity recorded during the previous unit of depth and time of drilling may be compared to the observed angularity of the cuttings 112 to identify if the angularity is increasing. A threshold size and/or angularity change may be enforced which should be satisfied to determine that the observed changes quantify as an increase or decrease. For instance, a size change threshold may be set at 10 square microns ($\mu m^2$). An observed decrease in size of 4 $\mu m^2$ therefore may not be considered a decrease in size due to failing to satisfy the size change threshold. If an increase in angularity and decrease in size is observed, it may be determined that the formation is changing. It may also be assumed that the drilling parameters are not optimized. Also, it may be assumed that the drill bit 226 is breaking down and is no longer fully functional.

If particles are increasing in angularity and decreasing in size, operations of the flowchart 900 continue at transition point K, which continues at transition point K of the flowchart 1000. From transition point K of the flowchart 1000, operations continue at block 1002. If particles are not increasing in angularity and decreasing in size, operations of the flowchart 900 continue at transition point L, which continues at transition point L of the flowchart 1000. From transition point L of the flowchart 1000, operations continue at block 1006.

At block 1002, a notification or alarm is output. The notification or alarm may indicate that a change in the formation is occurring. The notification or alarm may also indicate that the current drilling parameters are not optimized. The notification or alarm may also indicate that the drill bit is breaking down. For instance, with reference to FIGS. 1-2, the processors 130 can generate the notification or alarm which is output to the display 196.

At block 1004, drilling is modified by updating drilling parameters and/or replacing the drill bit. For example, with reference to FIGS. 1-2, the drill bit 226 may be replaced for subsequent drilling operations. Drilling parameters may also be updated by modifying rotation speed of the drill string 208, adjusting penetration rate of the drill bit 226, etc. Operations of the flowchart 1000 continue at transition point H, which continues at transition point H of the flowchart 1100. From transition point H of the flowchart 1100, operations are complete.

At block 1006, it is determined if particles are decreasing in angularity and increasing in size. For example, with reference to FIGS. 1-2, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is increasing. Similarly, particle angularity recorded during the previous unit of depth and time of drilling may be compared to the observed angularity of the cuttings 112 to identify if the angularity is decreasing. A threshold size and/or angularity change may be enforced which should be satisfied to determine that the observed changes quantify as an increase or decrease. Observation of an increase in particle size and a decrease in particle angularity may be indicative of poor cleanout of the borehole 212.

At block 1008, if particles are decreasing in angularity and increasing in size, a notification or alarm is output which indicates that there is poor hole cleanout. For instance, with reference to FIGS. 1-2, the processors 130 can generate the notification or alarm which is output to the display 196.

At block 1010, drilling is modified by increasing hole cleanout. For example, with reference to FIGS. 1-2, cleanout of the borehole 212 may be increased by increasing flow rate of drilling fluid, adjusting drilling fluid properties, etc. Operations of the flowchart 1000 continue at transition point H, which continues at transition point H of the flowchart 1100. From transition point H of the flowchart 1100, operations are complete.

At block 1012, if particles are not decreasing in angularity and increasing in size, it is determined if particles are decreasing in size and angularity. For example, with reference to FIGS. 1-2, the processors 130 may compare the shape and size data collected for the cuttings 112 currently present in the shaker screen 108 with previously acquired shape and size data stored in memory 150. Particle sizes recorded during the previous unit of depth and time of drilling may be compared to the cuttings 112 to identify if the size is decreasing. Similarly, particle angularity recorded during the previous unit of depth and time of drilling may be compared to the observed angularity of the cuttings 112 to identify if the angularity is decreasing. A threshold size and/or angularity change may be enforced which should be satisfied to determine that the observed changes quantify as an increase or decrease. If both size and angularity of particles are decreasing, it may be determined that hole cleanout is poor and/or current drilling parameters are not optimized. It may also be assumed that the drill bit 226 is wearing out.

If particles are not decreasing in size and angularity, operations of the flowchart 1000 continue at transition point H, which continues at transition point H of the flowchart 1100. From transition point H of the flowchart 1100, operations are complete. If particles are decreasing in size and angularity, operations of the flowchart 1000 continue at transition point M, which continues at transition point M of the flowchart 1100. From transition point M of the flowchart 1100, operations continue at block 1102.

At block 1102, a notification or alarm is output. The notification or alarm may indicate that the hole cleanout is poor. The notification or alarm may also indicate that the current drilling parameters are not optimized. The notification or alarm may also indicate that the drill bit is breaking down. For instance, with reference to FIGS. 1-2, the processors 130 can generate the notification or alarm which is output to the display 196.

At block 1104, drilling is modified by increasing hole cleanout, updating drilling parameters, and/or replacing the drill bit. For example, with reference to FIGS. 1-2, cleanout of the borehole 212 may be increased (e.g., by increasing flow rate of drilling fluid or adjusting drilling fluid properties). Drilling parameters may be updated by modifying rotation speed of the drill string 208, adjusting penetration rate of the drill bit 226, etc. The drill bit 226 may also be replaced.

Size and Shape Distribution-Based Analysis Operations of Downhole Drill Cuttings In some embodiments, a size distribution curve and/or a shape (angularity) distribution curve can be determined and used. The use of these distribution curves can be in place of or in addition to the operations above that are based on changes in the size, angularity and/or volume of the cuttings (described above). FIGS. 12-21 are flowcharts of operations for evaluating and possibly altering downhole drilling operations based on analysis of size and shape distributions of particles in downhole cuttings, according to some embodiments. Operations of flowcharts 1200-2100 of FIGS. 12-21 continue among each other through transition points N-DD. Operations of the flowcharts 1200-2100 can be performed by software, firmware, hardware or a combination thereof. The operations of the flowchart 1200 start at block 1202.

At block 1202, shape and size of individual particles from cuttings returned to the surface during drilling of a borehole are calibrated for. Calibration of particle analysis can be performed with items of a known size and shape. For instance, with reference to FIGS. 1-2, the imaging device 124 focuses on the cuttings 112. Calibration may occur when the cuttings 112 are on the shaker 104 itself or when the cuttings are on another flat surface with the same focal length. Size and shape data can be communicated to the workstation 156. The lasers 190 and/or 192 may be used to mark known sizes and/or shapes on the shaker 104. As similarly described with reference to FIGS. 6-11, when performing size and shape distribution-based analysis of cuttings from downhole, size can be used in addition to or in place of volume. Size is a two-dimensional measurement of a single cutting and is proportional to change in volume that is a three-dimensional measurement. Shape changes can be defined as changes in angularity, where higher angularities correspond to smaller angles and lower angularities correspond to larger angles.

At block 1204, a borehole is drilled with a drill string that includes sections of drill pipe and a drill bit. For example, with reference to FIGS. 1-2, the drill bit 226 included on the bottommost portion of the drill string 208 drills the borehole 212. The drill string 208 includes one or more sections of drill pipe 218.

At block 1206, actual cuttings and fluid are captured in a shaker screen at the surface for the unit of depth and time. For example, with reference to FIGS. 1-2, cuttings from the subsurface formation 214 are created during operation of the drill hit 226. Drilling fluid is used to remove the cuttings. The drilling fluid and cuttings are returned to the surface 204 during drilling of the borehole 212 for the determined unit of depth and time. The shaker screen 108 receives the drilling fluid which includes the cuttings. The drilling fluid may be filtered before or after it is received by the shaker screen 108 as to remove drilling fluid from the cuttings prior to analysis.

At block 1208, a bit depth is determined based on the number of joints of drill pipe. The depth of the drill bit can be calculated if the number of joints of drill pipe and the lengths of each respective joint of drill pipe are known. For example, with reference to FIGS. 1-2, the depth of the drill bit 226 is determined based on the number of joints of drill pipe 218 and the known lengths of each of the drill pipe 218 joints.

At block 1210, a pump rate of drilling fluid through the drill pipe is determined. The pump rate may be provided in pump strokes or volume of fluid pumped per minute. For example, with reference to FIGS. 1-2, the pump rate in addition to other drilling parameters may be stored in memory 150. The processors 130 may retrieve the pump rate from memory 150.

At block 1212, a volume of the annulus is determined. For example, with reference to FIGS. 1-2, the processor 130 can calculate the volume of the annular area 240. The processor 130 may determine the volume based on the diameter of the borehole 212, diameter of the drill pipe 218, and the depth of the drill bit 226.

At block 1214, a lag is determined based on the bit depth, the pump rate, and the volume of the annulus. The annular volume at the particular measured depth corresponding to the drill bit is determined based on the known drill bit depth and volume of the annulus. The lag can then be calculated using the resulting annular volume and the pump rate. For example, referring to FIGS. 1-2, the processors 130 can calculate the lag based on the depth of the drill hit 226, the volume of the annular area 240, and the pump rate of the mud pump 232. Operations of the flowchart 1200 continue at transition point N, which continues at transition point N of the flowchart 1300. From transition point N of the flowchart 1300, operations continue at block 1302.

At block 1302, a depth from which the actual cuttings are associated is determined based on the drill bit depth and lag. The annular volume at the particular measured depth corresponding to the drill bit is determined based on the known drill bit depth and volume of the annulus. The lag can then be calculated using the resulting annular volume and the pump rate. For example, referring to FIGS. 1-2, the processors 130 can calculate the lag based on the depth of the drill bit 226, the volume of the annular area 240, and the pump rate of the mud pump 232.

At block 1304, a camera is used to determine angularity and size distributions of particles in the cuttings in the shaker screen for the unit of depth and time. For example, with reference to FIGS. 1-2, the imaging device 124 focuses on the cuttings 112 and records images of the cuttings 112. The processors 130 may analyze the received images to determine corresponding shape and size data as similarly described with reference to FIGS. 6-11. The processors 130 may analyze the shape and size data to determine relative volume corresponding to observed shapes and sizes of particles. The processors 130 then generate angularity and size distribution curves based on the obtained shape and size data and relative volumes. The resulting angularity and size distribution data may subsequently be stored in memory 150.

At block 1306, trends of indicators of improper hole cleaning are captured. Example indicators of improper hole cleaning include changes in torque, drag, equivalent circulating density, and standpipe pressure. For instance, with reference to FIGS. 1-2, the processors 130 can obtain improper hole cleaning indicator data over a unit of depth and/or time for storage in memory 150. For example, the processors 130 may obtain current drilling parameters, mud weight, depth of the drill bit 226, etc. Data obtained for the time or depth interval can be input into calculations for determining values of the indicators. The combination of such indicators may be combined to create a positive indicator for improper hole cleaning.

At block 1308, it is determined if a size distribution indicates an increase in particle size and angularity distribution remains unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error. For example, if an increase in the mean particle size exceeds the threshold, it may be determined that the particle size has increased. If an increase in the mean angularity does not exceed the threshold and the spread is approximately equal, it may be determined that the angularity distribution is unchanged. An increase in particle size without a change in angularity may indicate that the formation has changed and/or that the pore pressure of the formation has increased relative to the drilling fluid weight.

At block 1310, if the size distribution indicates an increase in particle size and the angularity distribution is unchanged, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure of the formation is greater than the drilling fluid weight.

At block 1312, drilling is modified by increasing the drilling fluid weight. For example, with reference to FIGS. 1-2, the density of the drilling fluid pumped from the mud pit 234 downhole can be increased (e.g., through addition of barite or other additives). Operations of the flowchart 1300 continue at transition point Q, which continues at transition point Q of the flowchart 2100. From transition point Q of the flowchart 2100, operations are complete.

At block 1314, if the size distribution does not indicate an increase in particle size and/or the angularity distribution has changed, it is determined if the size distribution indicates a decrease in particle size and the angularity distribution is unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error and should be regarded as no change during analysis. When the distribution curves indicate that the size of particles is decreasing and the angularity distribution remains unchanged, it can be determined that the formation has changed and the pore pressure of the formation has reduced. Also, in this situation, can be determined that the drill bit 226 is breaking down (e.g., wearing out) and is no longer fully functional.

If the size distribution indicates a decrease in particle size and the angularity distribution is unchanged, operations of the flowchart 1300 continue at transition point O, which continues at transition point O of the flowchart 1400. From transition point O of the flowchart 1400, operations continue at block 1402. If the size distribution does not indicate a decrease in particle size and/or the angularity distribution has changed, operations of the flowchart 1300 continue at transition point P, which continues at transition point P of the flowchart 1400. From transition point P of the flowchart 1400, operations continue at block 1406.

At block 1402, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure of the formation has decreased. The notification or alarm could also indicate that the drill bit 226 is breaking down.

At block 1404, drilling is modified by replacing the drill bit. For instance, with reference to FIGS. 1-2, after determining that the drill bit 226 is breaking down, the drill bit 226 may be replaced for subsequent drilling operations. Operations of the flowchart 1400 continue at transition point Q, which continues at transition point Q of the flowchart 2100. From transition point Q of the flowchart 2100, operations are complete.

At block 1406, it is determined if a bimodal size distribution develops with a new peak at a smaller size and the angularity distribution is unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If a bimodal distribution occurs for the size distribution such that the new distribution is at a smaller size and angularity distribution does not change, it can be assumed that the formation has changed and/or the pore pressure of the formation has increased relative to the drilling mud weight. Also, in this situation, it can be assumed that the borehole cleaning is poor and cuttings are tumbling and remaining downhole (i.e., not returning to the surface). This information, when coupled with information such as changes in torque, drag, equivalent circulating density, standpipe pressure, etc., can lead to a positive indicator for improper borehole cleaning. Additionally, it can be assumed that the drill bit 226 is breaking down (e.g., wearing out) and is no longer fully functional.

At block 1408, if a bimodal size distribution develops with a new peak at a smaller size and the angularity distribution is unchanged, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure of the formation is greater than the drilling fluid weight. The notification or alarm may indicate that hole cleanout is poor. The notification or alarm could also indicate that the drill bit 226 is breaking down.

At block 1410, drilling is modified by increasing the weight of drilling fluid, increasing hole cleanout, and/or replacing the drill bit. For example, with reference to FIGS. 1-2, the density of the drilling fluid pumped from the mud pit 234 downhole can be increased (e.g., through addition of barite or other additives). Cleanout of the borehole 212 may be increased by increasing flow rate of drilling fluid, pumping pills, adjusting drilling fluid properties, or bottoms up cleaning etc. The drill bit 226 may also be replaced for subsequent drilling operations. Operations of the flowchart 1400 continue at transition point Q, which continues at transition point Q of the flowchart 2100. From transition point Q of the flowchart 2100, operations are complete.

At block 1412, if a bimodal size distribution does not develop with a new peak at a smaller size and/or the angularity distribution has changed, it is determined if a bimodal size distribution develops with a new peak at a larger size and the angularity distribution is unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If a bimodal distribution occurs for the size distribution such that the new distribution is at a larger size, it can be assumed that the formation has changed and/or the pore pressure of the formation has increased relative to the drilling fluid weight.

If a bimodal size distribution develops with a new peak at a larger size and the angularity distribution is unchanged, operations of the flowchart 1400 continue at transition point R, which continues at transition point R of the flowchart 1500. From transition point R of the flowchart 1500, operations continue at block 1502. If a bimodal size distribution does not develop with a new peak at a larger size and/or the angularity distribution has changed, operations of the flowchart 1400 continue at transition point S, which continues at transition point S of the flowchart 1500. From transition point S of the flowchart 1500, operations continue at block 1506.

At block 1502, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure of the formation is greater than the drilling fluid weight.

At block 1504, drilling is modified by increasing the weight of the drilling fluid. For example, with reference to FIGS. 1-2, the density of the drilling fluid pumped from the mud pit 234 downhole can be increased (e.g., through addition of barite or other additives). Operations of the flowchart 1500 continue at transition point Q, which continues at transition point Q of the flowchart 2100. From transition point Q of the flowchart 2100, operations are complete.

At block 1506, it is determined if the angularity distribution indicates an increase in angularity of particles and the size distribution remains unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error and should be regarded as no change during analysis. If an increase in angularity without a change in size is observed, it can be determined that the formation has changed and/or the pore pressure of the formation has increased.

At block 1508, if the angularity distribution indicates an increase in angularity of particles and the size distribution remains unchanged, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure of the formation has increased.

At block 1510, drilling is modified by increasing the weight of drilling fluid. For example, with reference to FIGS. 1-2, the density of the drilling fluid pumped from the mud pit 234 downhole can be increased (e.g., through addition of barite or other additives). Operations of the flowchart 1500 continue at transition point Q, which continues at transition point Q of the flowchart 2100. From transition point Q of the flowchart 2100, operations are complete.

At block 1512, if the angularity distribution does not indicate an increase in angularity of particles and/or the size distribution has changed, it is determined if the angularity distribution indicates a decrease in particle angularity and the size distribution is unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. Thresholds may be established for determining if an increase or decrease can be attributed to error and should be regarded as no change during analysis. If the angularity distribution indicates a shift to a lower particle angularity without a change in the size distribution, it can be assumed that the borehole cleaning is poor and cuttings are tumbling and remaining downhole and/or that the drill bit 226 is breaking down and is no longer fully functional. This information, when coupled with information such as changes in torque, drag, equivalent circulating density, standpipe pressure, etc., can lead to a positive indicator for improper borehole cleaning.

If the angularity distribution indicates a decrease in particle angularity and the size distribution is unchanged, operations of the flowchart 1500 continue at transition point T, which continues at transition point T of the flowchart 1600. From transition point T of the flowchart 1600, operations continue at block 1602. If the angularity distribution does not indicate a decrease in particle angularity and/or the size distribution has changed, operations of the flowchart 1500 continue at transition point U, which continues at transition point U of the flowchart 1600. From transition point U of the flowchart 1600, operations continue at block 1606.

At block 1602, a notification or alarm is output. For instance, with reference to FIGS. 1-2, the processors 130 can generate the notification or alarm which is output to the display 196. The notification or alarm may indicate that hole cleanout is poor. The notification or alarm could also indicate that the drill bit 226 is breaking down.

At block 1604, drilling is modified by increasing hole cleanout and/or replacing the drill bit. For instance, with reference to FIGS. 1-2, cleanout of the borehole 212 may be increased by increasing flow rate of drilling fluid, adjusting drilling fluid properties, etc. The drill bit 226 may also be replaced for subsequent drilling operations. Operations of the flowchart 1500 continue at transition point Q, which continues at transition point Q of the flowchart 2100. From transition point Q of the flowchart 2100, operations are complete.

At block 1606, it is determined if a bimodal angularity distribution has developed with a new peak at a lower angularity and the size distribution is unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If a bimodal distribution occurs for the angularity distribution such that the new distribution is at a lower angularity, it can be assumed that the formation has changed and/or that the borehole cleaning is poor and cuttings are tumbling and remaining downhole. In this situation, it can also be assumed that the drill bit 226 is breaking down and is no longer fully functional. This information, when coupled with information such as changes in torque, drag, equivalent circulating density, standpipe pressure, etc., can lead to a positive indicator for improper borehole cleaning.

At block 1608, a bimodal angularity distribution develops with a new peak at a lower angularity and the size distribution is unchanged, a notification or alarm is output. For instance, with reference to FIGS. 1-2, the processors 130 can generate the notification or alarm which is output to the display 196. The notification or alarm could indicate that a formation change is occurring. The notification or alarm may indicate that hole cleanout is poor. The notification or alarm could also indicate that the drill bit 226 is breaking down.

At block 1610, drilling is modified by increasing hole cleaning and/or replacing the drill bit. For example, with reference to FIGS. 1-2, cleaning of the borehole 212 may be increased by increasing flow rate of drilling fluid, adjusting drilling fluid properties, etc. Alternatively or in addition, the drill bit 226 may be replaced for subsequent drilling operations. Operations of the flowchart 1500 continue at transition point Q, which continues at transition point Q of the flowchart 2100. From transition point Q of the flowchart 2100, operations are complete.

At block 1612, a bimodal angularity distribution does not develop with a new peak at a lower angularity and/or the size distribution has changed, it is determined if a bimodal angularity distribution has developed with a new peak at a higher angularity and the size distribution is unchanged. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. A bimodal distribution occurring for the angularity distribution such that the new distribution is at a higher angularity can indicate that the formation has changed and/or that the pore pressure of the formation has increased relative to the drilling fluid weight.

If a bimodal angularity distribution develops with a new peak at a higher angularity and the size distribution is unchanged, operations of the flowchart 1600 continue at transition point V, which continues at transition point V of the flowchart 1700. From transition point V of the flowchart 1700, operations continue at block 1702. If a bimodal angularity distribution does not develop with a new peak at a higher angularity and/or the size distribution has changed, operations of the flowchart 1600 continue at transition point W, which continues at transition point W of the flowchart 1700. From transition point W of the flowchart 1700, operations continue at block 1706.

At block 1702, a notification or alarm is output. For instance, with reference to FIGS. 1-2, the processors 130 can generate the notification or alarm Which is output to the display 196. The notification or alarm could indicate that a formation change is occurring. The notification or alarm could also indicate that the pore pressure of the formation is greater than the drilling fluid weight.

At block 1704, drilling is modified by increasing the weight of drilling fluid. For example, with reference to FIGS. 1-2, the density of the drilling fluid pumped from the mud pit 234 downhole can be increased (e.g., through addition of barite or other additives). Operations of the flowchart 1700 continue at transition point Q, which continues at transition point Q of the flowchart 2100. From transition point Q of the flowchart 2100, operations are complete.

At block 1706, it is determined if the angularity and size distributions have both increased. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. Thresholds may be established for determining if an increase or decrease can be attributed to error. Increases in both angularity distribution and size distribution may indicate that the formation has changed and/or that the pore pressure of the formation has increased.

At block 1708, if the angularity and size distributions have both increased, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure of the formation has increased.

At block 1710, drilling is modified by increasing the weight of the drilling fluid. For example, with reference to FIGS. 1-2, the density of the drilling fluid pumped from the mud pit 234 downhole can be increased (e.g., through addition of barite or other additives). Operations of the flowchart 1700 continue at transition point Q, which continues at transition point Q of the flowchart 2100. From transition point Q of the flowchart 2100, operations are complete.

At block 1712, if the angularity and size distributions have not both increased, it is determined if the angularity distribution is increasing and the size distribution is decreasing. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. If the angularity distribution increases and the size distribution decreases, it may be assumed that the formation has changed and/or that the drilling parameters are not optimized.

If the angularity distribution is increasing and the size distribution is decreasing, operations of the flowchart 1700 continue at transition point X, which continues at transition point X of the flowchart 1800. From transition point Y of the flowchart 1800, operations continue at block 1802. If the angularity distribution is not increasing and/or the size distribution is nondecreasing, operations of the flowchart 1700 continue at transition point Y, which continues at transition point Y of the flowchart 1800. From transition point W of the flowchart 1800, operations continue at block 1806.

At block 1802, a notification or alarm is output. For instance, with reference to FIGS. 1-2, the processors 130 can generate the notification or alarm which is output to the display 196. The notification or alarm could indicate that a formation change is occurring. The notification or alarm may also indicate that the current drilling parameters are not optimized.

At block 1804, drilling is modified by adjusting drilling parameters. For example, with reference to FIGS. 1-2, drilling parameters may be updated by modifying rotation speed of the drill string 208, adjusting penetration rate of the drill bit 226, etc. Operations of the flowchart 1800 continue at transition point Q, which continues at transition point Q of the flowchart 2100. From transition point Q of the flowchart 2100, operations are complete.

At block 1806, it is determined if the angularity distribution is decreasing and the size distribution is increasing. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. Thresholds may be established for determining if an increase or decrease can be attributed to error. If the angularity distribution has decreased and the size distribution has increased, it can be assumed that borehole cleaning is poor and cuttings are tumbling and remaining downhole. This information, when coupled with information such as changes in torque, drag, equivalent circulating density, standpipe pressure, etc., can lead to a positive indicator for improper borehole cleaning.

At block 1808, if the angularity distribution is decreasing and the size distribution is increasing, a notification or alarm indicating that hole cleanout is poor is output. For instance, with reference to FIGS. 1-2, the processors 130 can generate the notification or alarm which is output to the display 196.

At block 1810, drilling is modified by increasing hole cleaning. For instance, with reference to FIGS. 1-2, cleanout of the borehole 212 may be increased by increasing flow rate of drilling fluid, adjusting drilling fluid properties, etc. Operations of the flowchart 1800 continue at transition point Q, which continues at transition point Q of the flowchart 2100. From transition point Q of the flowchart 2100, operations are complete.

At block 1812, if the angularity distribution is not decreasing and/or the size distribution is nonincreasing, it is determined if the angularity and size distributions are both decreasing. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Increases or decreases in distribution between the previous and current distribution curves may be determined based on mean, spread, standard deviation, etc. Thresholds may be established for determining if an increase or decrease can be attributed to error. If the angularity and size distributions are both decreasing, it can be assumed that borehole cleaning is poor and cuttings are tumbling and remaining downhole. This information, when coupled with information such as changes in torque, drag, equivalent circulating density, standpipe pressure, etc., can lead to a positive indicator for improper borehole cleaning. In this situation, it can also be assumed that drilling parameters are not optimized. Additionally, it may be assumed that the drill bit 226 is breaking down and is no longer fully functional.

If the angularity and size distributions are both decreasing, operations of the flowchart 1800 continue at transition point Z, which continues at transition point Z of the flowchart 1900. From transition point Z of the flowchart 1900, operations continue at block 1902. If the angularity and size distributions are not both decreasing, operations of the flowchart 1800 continue at transition point AA, which continues at transition point AA of the flowchart 1900. From transition point AA of the flowchart 1900, operations continue at block 1906.

At block 1902, a notification or alarm is output. For instance, with reference to FIGS. 1-2, the processors 130 can generate the notification or alarm which is output to the display 196. The notification or alarm could indicate that a formation change is occurring. The notification or alarm may also indicate that the current drilling parameters are not optimized. The notification or alarm could also indicate that the drill bit 226 is breaking down.

At block 1904, drilling is modified by modifying drilling parameters and/or replacing the drill bit. For instance, with reference to FIGS. 1-2, drilling parameters may be updated by modifying rotation speed of the drill string 208, adjusting penetration rate of the drill bit 226, etc. The drill bit 226 may also be replaced for subsequent drilling operations. Operations of the flowchart 1900 continue at transition point Q, which continues at transition point Q of the flowchart 2100. From transition point Q of the flowchart 2100, operations are complete.

At block 1906, it is determined if bimodal distributions have developed for both angularity and size with new peaks at increases in angularity and size, respectively. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If bimodal distributions with new peaks at an increased angularity and size develop, it can be assumed that the formation has changed and/or that the pore pressure of the formation has increased.

At block 1908, if bimodal distributions have developed for both angularity and size with new peaks at increases in angularity and size, a notification or alarm is output. For instance, with reference to FIGS. 1-2, the processors 130 can generate the notification or alarm which is output to the display 196. The notification or alarm could indicate that a formation change is occurring. The notification or alarm could also indicate that the pore pressure of the formation has increased.

At block 1910, drilling is modified by increasing the weight of drilling fluid. For example, with reference to FIGS. 1-2, the density of the drilling fluid pumped from the mud pit 234 downhole can be increased (e.g., through addition of barite or other additives), Operations of the flowchart 1900 continue at transition point Q, which continues at transition point Q of the flowchart 2100. From transition point Q of the flowchart 2100, operations are complete.

At block 1912, if bimodal distributions have not developed for both angularity and size with new peaks at increases in angularity and size, it is determined if bimodal distributions have developed for both angularity and size with new peaks at a higher angularity and decreased size. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis.

If bimodal distributions have developed for both angularity and size with new peaks at an increased angularity and decreased size, operations of the flowchart 1900 continue at transition point BB, which continues at transition point BB of the flowchart 2000. From transition point BB of the flowchart 2000, operations continue at block 2002. If bimodal distributions have not developed for both angularity and size with new peaks at an increased angularity and decreased size, operations of the flowchart 1900 continue at transition point CC, which continues at transition point CC of the flowchart 2000. From transition point CC of the flowchart 2000, operations continue at block 2006.

At block 2002, a notification or alarm is output. For instance, with reference to FIGS. 1-2, the processors 130 can generate the notification or alarm which is output to the display 196. The notification or alarm could indicate that a formation change is occurring. The notification or alarm may also indicate that the current drilling parameters are not optimized. The notification or alarm could also indicate that the pore pressure of the formation has increased.

At block 2004, drilling is modified by modifying drilling parameters and/or increasing the weight of the drilling fluid. For example, with reference to FIGS. 1-2, drilling parameters may be updated by modifying rotation speed of the drill string 208, adjusting penetration rate of the drill bit 226, etc. The density of the drilling fluid pumped from the mud pit 234 downhole can be increased (e.g., through addition of barite or other additives). Operations of the flowchart 2000 continue at transition point Q, which continues at transition point Q of the flowchart 2100. From transition point Q of the flowchart 2100, operations are complete.

At block 2006, it is determined if bimodal distributions have developed for both angularity and size with new peaks at a lower angularity and increased size. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc.

Thresholds may be established for determining if an increase or decrease can be attributed to error and should he regarded as no change during analysis.

At block 2008, if the angularity and size distributions are both bimodal with nee peaks at increased size and lower angularity, a notification or alarm is output. For instance, with reference to FIGS. 1-2, the processors 130 can generate the notification or alarm which is output to the display 196. The notification or alarm could indicate that a formation change is occurring. The notification or alarm may indicate that hole cleanout is poor. The notification or alarm could also indicate that the pore pressure of the formation has increased.

At block 2010, drilling is modified by increasing hole cleaning and/or increasing the weight of drilling fluid. For instance, with reference to FIGS. 1-2, cleanout of the borehole 212 may be increased by increasing flow rate of drilling fluid, adjusting drilling fluid properties, etc. The density of the drilling fluid pumped from the mud pit 234 downhole can also be increased (e.g., through addition of barite or other additives). Operations of the flowchart 2000 continue at transition point Q, which continues at transition point Q of the flowchart 2100. From transition point Q of the flowchart 2100, operations are complete.

At block 2012, if the angularity and size distributions are not both bimodal with new peaks at increased size and lower angularity, it is determined if the angularity and size distributions are both bimodal with new peaks at decreased size and lower angularity. For instance, with reference to FIGS. 1-2, the processors 130 can retrieve from memory 150 the size and angularity distributions generated for the previous unit of depth and time of drilling. The size and angularity distributions determined for the current unit of depth and time of drilling are compared with the previously-generated distributions. Previous and current distribution curves may be analyzed based on mean, spread, standard deviation, etc. The processors 130 may determine that a bimodal distribution has developed based on identifying two distinct mean values, through curve analysis, etc. Thresholds may be established for determining if an increase or decrease can be attributed to error and should be regarded as no change during analysis. If bimodal distribution occurs for both the size and angularity such that the new distribution for the size is decreasing and the new distribution for the angularity is lower, it can be assumed that the borehole cleaning is poor and cuttings are tumbling and remaining downhole. This information, when coupled with information such as changes in torque, drag, equivalent circulating density, standpipe pressure, etc., can lead to positive indicator for improper borehole cleaning. In this situation, it can also be assumed that current drilling parameters are not optimized and/or that the drill bit 226 is breaking down and is no longer fully functional.

If the angularity and size distributions are both bimodal with new peaks at decreased size and lower angularity, operations of the flowchart 2000 continue at transition point DD, which continues at transition point DD of the flowchart 2100. From transition point DD of the flowchart 2100, operations continue at block 2102. If the angularity and size distributions are bot both bimodal with new peaks at decreased size and lower angularity, operations of the flowchart 2000 continue at transition point Q, which continues at transition point Q of the flowchart 2100. From transition point Q of the flowchart 2100, operations are complete.

At block 2102, a notification or alarm is output. For instance, with reference to FIGS. 1-2, the processors 130 can generate the notification or alarm Which is output to the display 196. The notification or alarm may indicate that hole cleanout is poor. The notification or alarm may also indicate that the current drilling parameters are not optimized. The notification or alarm could also indicate that the drill bit 226 is breaking down.

At block 2104, drilling is modified by increasing hole cleanout, updating drilling parameters, and/or replacing the drill bit. For example, with reference to FIGS. 1-2, cleanout of the borehole 212 may be increased by increasing flow rate of drilling fluid, adjusting drilling fluid properties, etc. Drilling parameters may also be updated by modifying rotation speed of the drill string 208, adjusting penetration rate of the drill bit 226, etc. The drill bit 226 also may be replaced for subsequent drilling operations.

Example Fracturing Application

Figure 22:
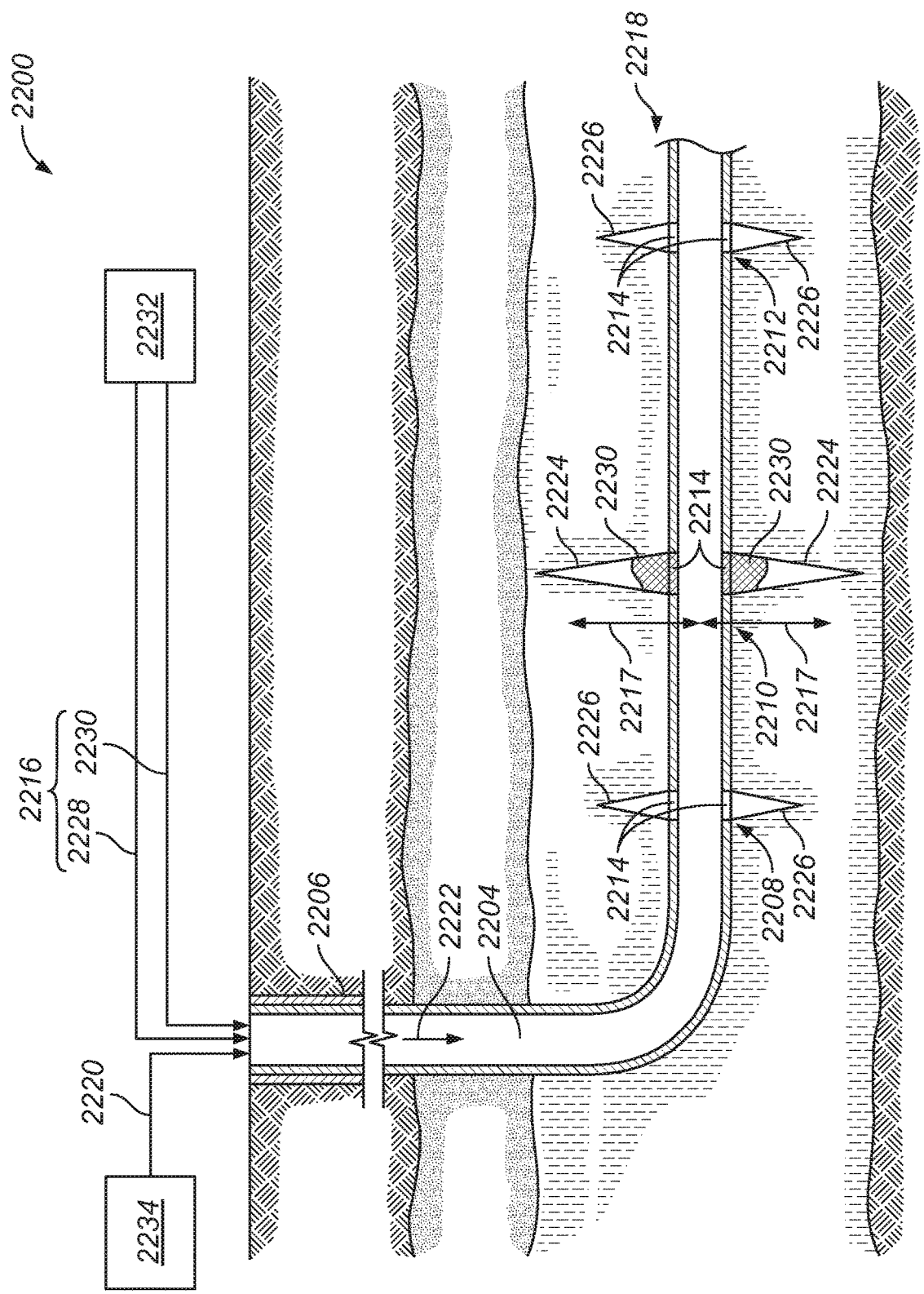
FIG. 22 is a schematic diagram of a fracturing operation, according to some embodiments.

Some embodiments can be used for processing and analyzing particles from downhole that are a result of fracturing operations. To illustrate, FIG. 22 depicts a schematic diagram of a system that includes downhole fracturing, according to some embodiments. In FIG. 22, a formation 2200 is composed of porous and permeable rocks that include hydrocarbons, e.g., in a reservoir, located in an onshore environment or in an offshore environment. The formation 2200 may be located in the range of a few hundred feet to a few tens of thousands of feet below a around surface. A wellbore 2204 is drilled to penetrate the formation 2200 and to allow production of hydrocarbons from the formation 2200. The wellbore 2204 of FIG. 22 is formed at any suitable angle to reach the hydrocarbon portion of the formation 2200. For example, the wellbore 2204 can follow a near-vertical, partially-vertical, angled, or even a partially-horizontal path through the formation 2200. The wellbore 2204 may be lined with a protective lining 2206 extending through the formation 2200. The protective lining 2206 can include a casing, liner, piping, or tubing and is made of any material, including steel, alloys, or polymers, among others. The protective lining 2206 of FIG. 22 extends vertically downward and continues horizontally to further extend through the formation 2200. In other examples, the wellbore 2204 can be completely or partially lined or fully openhole, i.e., without the protective lining.

Hydrocarbons are located in the pore volume space of the formation 2200 and may be produced when the pore spaces are connected and permeability, or the ability to transmit proppants, is such that the hydrocarbons flow out of the formation 2200 and into the wellbore 2204. In some cases, the formation 2200 may have low permeability, and the hydrocarbons do not readily flow, or production is hampered due to formation damage. Thus, to further stimulate and to extract the hydrocarbons, a reservoir stimulation treatment program is initiated to break, fracture, or induce dilation of existing natural fractures in the rock of the formation 2200. The reservoir stimulation treatment program can include perforating the protective lining 2206, or installing stimulation specific protective lining equipment, to create formation entry points 2214, e.g., perforations, sliding stimulation sleeves, etc. The formation entry points 2214 provide a pathway for the hydrocarbons to flow from the formation 2200 and into the wellbore 2204.

Mechanical isolation and compartmentalization tools can be used such that the formation entry points 2214 segment the formation 2200 into any number of production zones where fracturing programs can be carried out. As shown in FIG. 22, the formation 2200 includes a first production zone 2208, a second production zone 2210, and a third production zone 2212. Each zone 2208, 2210, 2212 can be stimulated individually or simultaneously with other zones depending on the mechanical isolation and compartmentalization system employed. It should be understood that the number of zones in FIG. 22 is one example embodiment and that a wide variety of other examples, including increasing or decreasing the number of zones in the formation 2200, are possible.

The reservoir stimulation treatment program of the embodiments includes injecting proppants (such as a pressurized treating fluid 2216) into the wellbore 2204 to stimulate one or more of the production zones 2208, 2210, 2212. The treating fluid 2216 can be stored in injection equipment 2232, such as a storage tank or pipeline. The treating fluid 2216 is pumped from the injection equipment 2232 and into the wellbore 2204 with pressure greater than the fracture gradient or fissure opening pressure of the formation 2200. Other suitable programs can be used to flow the treating fluid 2216 into the wellbore 2204, for example, via a conduit, such as coiled tubing or piping, located within the wellbore 2204. As the treating fluid 2216 flows through the formation entry points 2214, the increased pressure created by the flowing treating fluid 2216 cracks the formation 2200 to create or further widen a network of fractures 2218. The network of fractures 2218 of FIG. 22 may include high flow capacity fractures 2224 and low flow capacity fractures 2226. The high flow capacity fractures 2224 are located in lower relative total stress areas of the stimulation interval where fluids from a conventional hydraulic fracturing treatment can be injected with little or no mechanical manipulation. The low flow capacity fractures 2226 are located in higher relative total stress areas where little to no fluids from a convention hydraulic fracturing treatment would be injected without mechanical manipulation.

The treating fluid 2216 includes a carrier fluid, i.e., a fracturing fluid 2228, and may also include a stimulation material 2230 at times. The fracturing fluid 2228 can include energized or non-energized water, brine, gels, cross-linked fluids, mineral or organic acids, non-aqueous based fluids, or any other type of fluids capable of fracturing the formation 2200 and transporting the stimulation material 2230 into the fractures 2224, 2226. The stimulation material 2230 is suspended in the fracturing fluid 2228 and settles into the high flow capacity fractures 2224, or low flow capacity fractures 2226 to hold the fractures open so as to permit the flow of hydrocarbons from the reservoir and into the wellbore 2204. The stimulation material 2230 can include proppant, such as small spheres composed of sand, ceramic material, plastics, and resins, or other conductivity enhancement materials.

The treating fluid 2216 may also include additives to optimize the fracturing program. The types of additives used can vary depending on the properties of the formation 2200 and the composition of the treating fluid 2216, among other factors. In particular, the additives can include stabilizers, surfactants, foamers, gel breakers, fluid loss additives, friction reducers, scale inhibitors, biocides, and pH control additives, and the like. In the embodiments, an additive (i.e., a flow constraint material (FCM) 2220) can be stored in FCM injection equipment 2234 to be injected into the wellbore 2204. Accordingly, the FCM 2220 can flow simultaneously with the treating fluid 2216 into the wellbore 2204. The FCM 2220 can be a particulate, rheological, or chemical additive that partially constrains or redistributes the flow of the treating fluid 2216 to a higher relative stress area, e.g., the low flow capacity fractures 2226, without completely diverting the fluid 2216 from the lower total stress area, e.g., the area where the high flow capacity fractures 2224 are located.

Analysis Operations of Downhole Particles from Fracturing Operations

Figure 23:
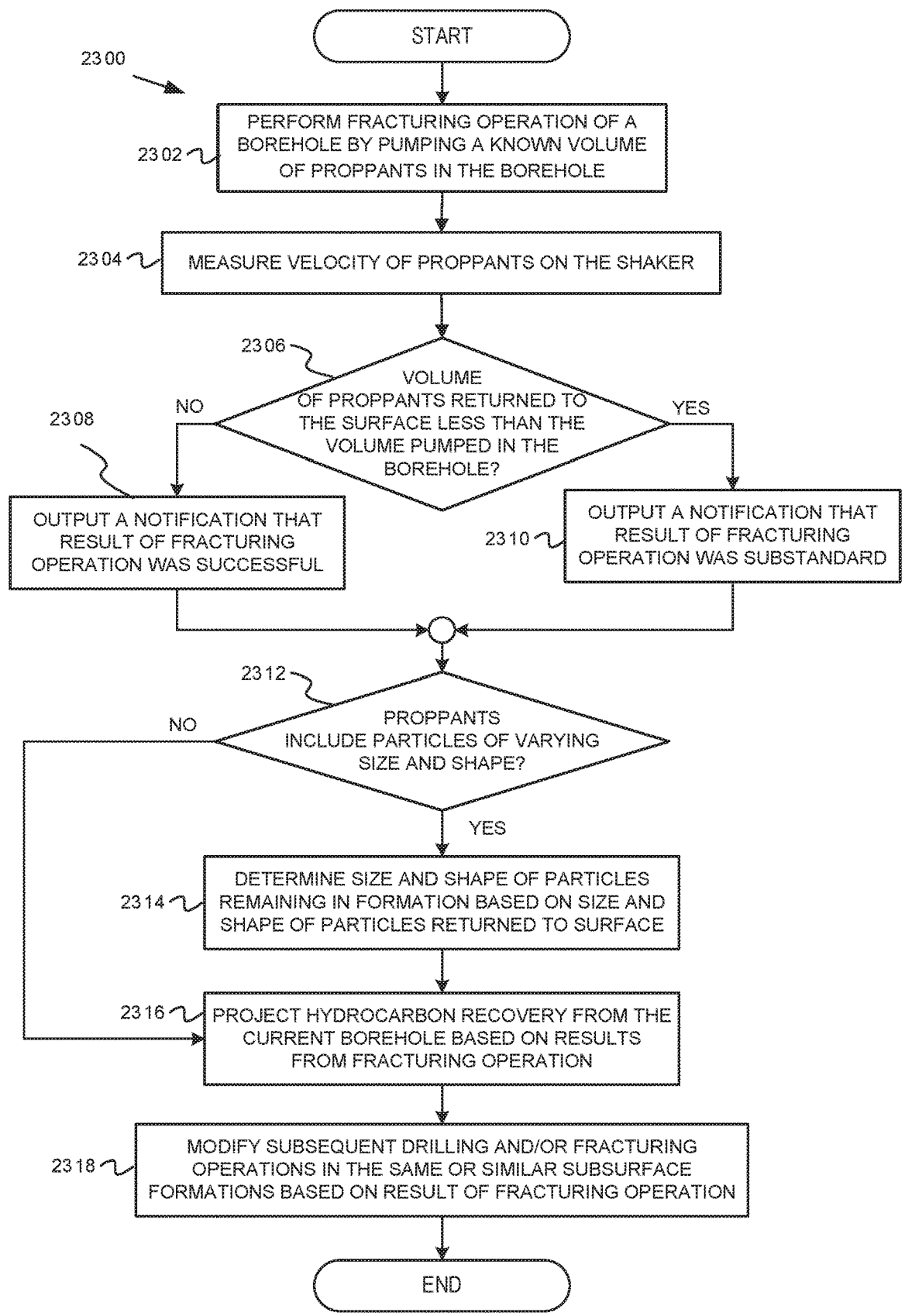
FIG. 23 is a flowchart of operations for evaluating and using results of a fracturing operation, according to some embodiments.

Example operations of analyzing and using downhole particles returned to the surface from fracturing operations. FIG. 23 is a flowchart of operations for evaluating and using results of a fracturing operation, according to some embodiments. Operations of flowchart 2300 can be performed by software, firmware, hardware, or a combination thereof. The operations of the flowchart 2300 start at block 2302.

At block 2302, a fracturing operation of a borehole is performed by pumping a known volume of proppant (e.g., sand) in the borehole. For instance, with reference to FIG. 22, injection equipment 2232 pumps fracturing fluid 2228 ("fluid 2228") into the wellbore 2204. The fluid 2228 contains a known volume of proppant. Proppant may remain in the fractures 2218 in the wellbore 2204 to keep the fractures 2218 open.

At block 2304, the velocity of the proppants on the shaker is determined. The velocity of the proppants may be determined using traditional approach of tracking a particle over a certain distance for a certain amount of time. For example, with reference to FIGS. 1-2, the imaging device 124, in conjunction with a velocity capture algorithm can be used to track the velocity of the proppants. Other methods using radars, may also be used to determine velocity of particles. This can be done by mounting a reference target on a static portion of the shaker 104 and capturing the pixel movement using the imaging device 124. An algorithm may be selected to capture the pixel movement on the shaker 104. Other methods using accelerometers may also be used to baseline the vibrations on the shaker screen 108.

At block 2306, it is determined if the volume of proppant returned to the surface is less than the volume of proppant pumped in the borehole. The volume of proppant returned to the surface is determined with a process similarly used during volume analysis of downhole particles as described with reference to FIGS. 3-5. For example, with reference to FIGS. 1 and 22, the fluid 2228 and proppant are returned to the surface and deposited onto the shaker screen 108. The lasers 190 and/or 192 may then emit coherent electromagnetic radiation onto the proppant deposited onto the shaker screen 108. The imaging device 124 captures an image of the line of coherent radiation. The processors 130 can analyze the captured image to determine the distance between the initial line and the deflection of the line resulting from contact with the proppant. The resulting distance is used to determine the volume of the proppant which has been returned to the surface based on geometric relationships between known distances and/or thicknesses (e.g., with triangle properties) and/or by comparing the measured distance with distances previously measured for objects of a known thickness which are stored in memory 150 (e.g., in a lookup table). Volume of the proppants can be obtained by multiplying the surface area of the cuttings (determined by laser deflection) and the velocity of proppants passing over the laser line. An error threshold for the volume of proppant returned to the surface may be enforced. If the volume of proppant returned to the surface exceeds the error threshold, the fracturing operations can be defined as not being properly performed. For instance, an error threshold of 10% of the initial volume may be established. If the volume of proppant returned to the surface exceeds 10% of the volume initially pumped into the wellbore 2204, it is determined that an insufficient amount of proppant remained in the fractures 2218.

At block 2308, if the volume of proppants returned to the surface is not less than the volume of proppants pumped in the borehole, a notification or alarm which indicates that the result of the fracturing operation was successful is output. For instance, with reference to FIGS. 1 and 22, the processors 130 can generate the notification or alarm which is output to the display 196. A fracturing operation can be considered successful if essentially all of the proppants remain in the fractures 2218 (e.g., the percent of the proppant pumped into the wellbore 2204 which is returned to the surface is within the error threshold).

At block 2310, if the volume of proppants returned to the surface is less than the volume of proppants pumped in the borehole, a notification or alarm which indicates that the result of the fracturing operations was substandard is output. For instance, with reference to FIGS. 1 and 22, the processors 130 can generate the notification or alarm which is output to the display 196.

At block 2312, it is determined if the proppant returned to the surface includes particles of varying size and shape. The fluid which contains proppants returned to the surface may also include particles from the formation. Accordingly, a determination can be made as to which particles (specific to size and/or shape) were returned to the surface instead of remaining downhole (e.g., in the formation). The presence of particles with varying sizes and shapes can be determined through particle shape and size analysis as similarly described with reference to FIGS. 6-11 and/or FIGS. 12-21. For instance, with reference to FIGS. 1 and 22, the particles of the proppant can correspond to a distinct shape and size. This shape and size may be calibrated for prior to pumping the fluid 2228 into the wellbore 2204. After the fluid 2228 containing proppant and/or particles from the formation 2200 has returned to the surface and has been deposited into the shaker screen 108, images of the proppant and/or particles are captured with the imaging device 124. The images and the shape and size data determined from the images can be stored in memory 150. The shapes and sizes and/or shape and size distributions can be observed to determine if particles which deviate from the expected shape and size of the proppant have been returned to the surface. For instance, when performing shape (i.e., angularity) and size distribution analysis, the processors 130 generate size and angularity distributions based on the shape and size data collected for the particles. The processors 130 can then determine whether shapes and/or sizes outside of those expected for the proppant are present. For instance, distribution spreads may be generated for the particles contained in the shaker screen 108. An error threshold corresponding to observed distribution spread may be established. If the spread of the angularity and/or size distributions for the particles returned with the fluid 2228 exceeds the error threshold, the processors 130 may determine that particles of varying size and shape from the formation 2200 have been returned to the surface with the proppant. If particles of varying size and shape have been returned with the proppant, operations continue at block 2312. Otherwise, if particles of varying size and shape were not returned with the proppant, operations continue at block 2314.

At block 2314, the size and shape of particles remaining in the formation are determined based on the size and shape of particles which are returned to the surface. For instance, with reference to FIGS. 1 and 22, the processors 130 may analyze the shape and size data obtained for the particles from the formation 2200 captured in the shaker screen 108 as similarly described with reference to FIGS. 6-11 and 12-21 (e.g., by analyzing images of the particles in the shaker screen 108). The particles returned to the surface with the fluid 2228 can be determined to be similar in size and shape with respect to the particles which remain in the formation 2200. For instance, based on analysis of the shape and angularity distributions, the processors 130 may determine that the particles from the formation 2200 correspond to a large size and a low angularity (e.g., through analysis of the distribution means, spreads, etc.) The results of particle analysis may be output to the display 196.

At block 2316, hydrocarbon recovery from the current borehole is projected based on the results of the fracturing operation. The volume of proppant remaining in the wellbore 2204 as a result of fracturing may be used to determine projected hydrocarbon recovery. Subsequent operations to determine hydrocarbon recovery from fracturing operations can leverage the knowledge of the proppant remaining in the wellbore 2204 and/or the shapes and sizes of particles dislodged from and/or remaining in the formation 2200.

At block 2318, subsequent drilling and/or fracturing operations in the same or similar subsurface formations are modified based on the result of the fracturing operation. For instance, if a low volume of proppant remains in the fractures 2218 (i.e., the volume of proppant returned to the surface exceeds the error threshold), subsurface formations with similar properties relative to the current formation may be avoided for subsequent fracturing operations. Completion of fracturing stages may also be altered.

Example Computer

Figure 24:
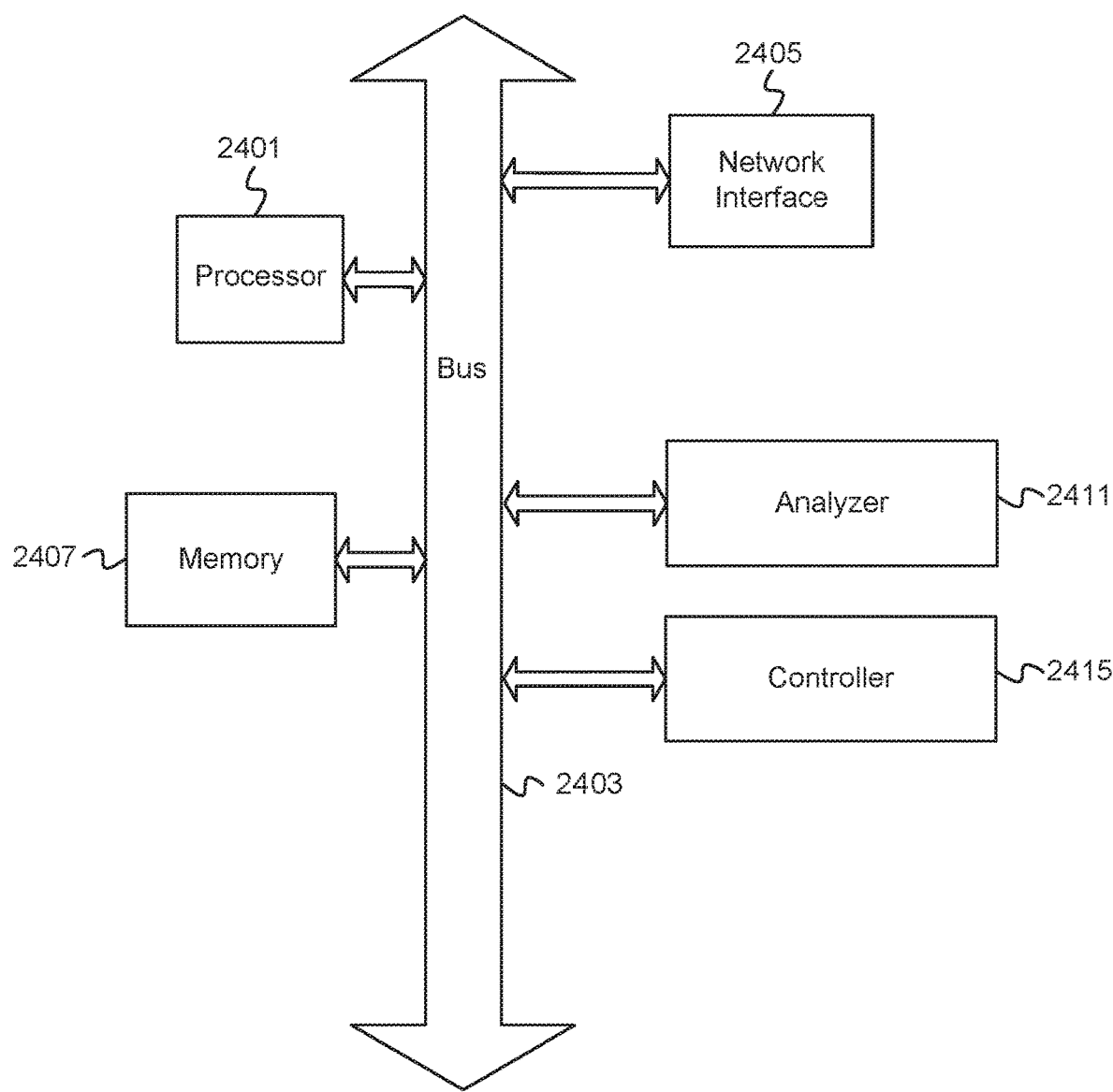
FIG. 24 is an example computer, according to some embodiments

FIG. 24 depicts an example computer, according to some embodiments. The computer includes a processor 2401 (possibly including multiple processors, multiple cores, multiple nodes, and/or implementing multi-threading, etc.). The computer includes memory 2407. The memory 2407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 2403 (e.g., PCI, ISA, PCI-Express, HyperTransport® bus, InfiniBand® bus, NuBus, etc.) and a network interface 2405 (e.g., a Fiber Channel interface, an Ethernet interface, an internet small computer system interface, SONET interface, wireless interface, etc.). While depicted as a computer, some embodiments can be any type of device or apparatus to perform operations described herein.

The computer also includes an analyzer 2411 and a controller 2415. The analyzer 2411 can perform processing and analyzing of the downhole particles (as described above). The controller 2415 can control the different operations that can occur in the response to results from the analysis. For example, the controller 2415 can communicate instructions to the appropriate equipment, devices, etc. to alter the drilling operations. Any one of the previously described functionalities may be partially (or entirely) implemented in hardware and/or on the processor 2401. For example, the functionality may be implemented with an application specific integrated circuit, in logic implemented in the processor 2401, in a co-processor on a peripheral device or card, etc. Further, realizations may include fewer or additional components not illustrated in FIG. 24 (e.g., video cards, audio cards, additional network interfaces, peripheral devices, etc.). The processor 2401 and the network interface 2405 are coupled to the bus 2403. Although illustrated as being coupled to the bus 2403, the memory 2407 may be coupled to the processor 2401.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Using the apparatus, systems, and methods disclosed herein may provide the ability to monitor changes in down hole particles (e.g., cuttings), so that the impact of drilling fluid properties and activities in the field can be assessed immediately. This ability may be used to increase efficiency by redirecting pumping and drilling operations in real-time, perhaps as part of a closed-loop control system.

While the aspects of the disclosure are described with reference to various implementations and exploitations, it will be understood that these aspects are illustrative and that the scope of the claims is not limited to them. In general, techniques for processing and analyzing of particles from downhole as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: performing a downhole operation in a borehole; capturing, during the downhole operation, downhole particles at a surface from the borehole into a shaker screen; emitting coherent electromagnetic radiation onto the downhole particles in the shaker screen; determining a measured volume of the downhole particles based on the coherent electromagnetic radiation emitted into the downhole particles; and in response to determining a difference between the measured volume and a projected volume of anticipated downhole particles exceeds an error threshold outputting a notification of a downhole condition occurring based on the measured volume.

Embodiment 2: The method of Embodiment 1, further comprising in response to determining a difference between the measured volume and a projected volume of anticipated downhole particles exceeds an error threshold, determining an indicator of improper borehole cleaning based on the measured volume of the downhole particles and at least one of change in torque of a drill string used for drilling the borehole, drag of the drill string, circulation density, and standpipe pressure.

Embodiment 3: The method of Embodiment 1 or 2 further comprising: determining angularity and size of the downhole particles based, at least in part, of captured images of the downhole particles; and in response to determining a change in at least one of the angularity and size of the downhole particles, outputting a notification of a downhole condition occurring based on the change in east one of angularity and size.

Embodiment 4: The method of any one of Embodiments 1-3, further comprising determining the projected volume of anticipated downhole particles based on a size of the borehole.

Embodiment 5: A method comprising: determining a projected volume of projected cuttings returning to a surface of the Earth during drilling of a borehole to be drilled for a unit of depth and a unit of time; drilling the borehole with a drill string having sections of drill pipe and a drill bit; capturing, during the drilling, actual cuttings at the surface from the borehole into a shaker screen for the unit of depth of the borehole drilled for the unit of time; emitting coherent electromagnetic radiation onto the actual cuttings in the shaker screen; measuring a measured volume of the actual cuttings for the unit of depth and the unit of time based on the coherent electromagnetic radiation emitted into the actual cuttings; and in response to determining a difference between the measured volume and the projected volume exceeds an error threshold, outputting a notification of a downhole condition occurring needing correction by modifying the drilling.

Embodiment 6: The method of Embodiment 5, further comprising: determining a depth of the drill bit in the borehole based on the number of the sections of the drill pipe; determining a lag based on the depth of the drill bit, a pump rate of drilling fluid through the drill string, and a volume of an annulus defined between the drill string and a wall of the borehole; and determining a depth in the borehole from which the actual cuttings originate based on a depth of the drill bit and the lag.

Embodiment 7: The method of Embodiments 5 or 6, wherein in response to determining the difference between the measured volume and the projected volume exceeds the error threshold, modifying the drilling in response to the notification.

Embodiment 8: The method of any one of Embodiments 5-7, wherein in response to determining the difference between the measured volume and the projected volume exceeds the error threshold and in response determining that the measured volume is less that the projected volume, outputting a notification of the downhole condition comprises outputting the notification of cuttings build up in the borehole, and modifying the drilling comprises performing a clean out of cuttings in the borehole.

Embodiment 9: The method of any one of Embodiments 5-7, wherein in response to determining the difference between the measured volume and the projected volume exceeds the error threshold and in response determining that the measured volume is less that the projected volume, outputting the notification of the downhole condition comprises outputting a notification of cuttings build up in the borehole, and modifying the drilling comprises replacing at least one of a reamer of the drill string and the drill bit.

Embodiment 10: The method of any one of Embodiments 5-7, wherein response to determining the difference between the measured volume and the projected volume exceeds the error threshold and in response determining that the measured volume is greater that the projected volume, outputting the notification of the downhole condition comprises outputting the notification of collapsing of the borehole, and modifying the drilling comprises increasing a weight of a drilling mud being supplied through the drill string during the drilling.

Embodiment 11: The method of any one of Embodiments 5-10, wherein determining the projected volume of projected cuttings comprises determining the projected volume of projected cuttings based on a size of the borehole.

Embodiment 12: A system comprising: a shaker screen onto which downhole particles and fluid from a borehole are to be placed, the downhole particles a product of a downhole operation; a shaker to vibrate the shaker screen to separate the downhole particles from the fluid; a coherent electromagnetic radiation emitter to emit coherent electromagnetic radiation onto the downhole particles on the shaker screen; a camera to capture images of the coherent electromagnetic radiation being emitted onto the downhole particles; and a device to determine a volume of the downhole particles on the shaker screen based on the images of the coherent electromagnetic radiation.

Embodiment 13: The system of Embodiment 12, wherein the device is to, in response to a determination that a difference between a measured volume and a projected volume exceeds an error threshold, output a notification of a downhole condition occurring based on the determined volume.

Embodiment 14: The system of Embodiments 12 or 13, further comprising: a drill string having sections of drill pipe and a drill bit to drill the borehole, wherein the downhole particles comprise cuttings, and wherein the device is to determine the volume of the cuttings for a unit of depth and a unit of time for the borehole being drilled based on the coherent electromagnetic radiation emitted into the cuttings.

Embodiment 15: The system of Embodiment 14, wherein the device is to, determine a depth of the drill bit in the borehole based on the number of the sections of the drill pipe; determine a lag based on the depth of the drill bit, a pump rate of drilling fluid through the drill string, and a volume of an annulus defined between the drill string and a wall of the borehole; and determine a depth in the borehole from which the cuttings originate based on a depth of the drill bit and the lag.

Embodiment 16: The system of Embodiments 14 or 15, wherein the device is to, determine a projected volume of projected cuttings returning to a surface of the Earth during drilling of the borehole to be drilled for a unit of depth and a unit of time.

Embodiment 17: The system of any one of Embodiments 14-16, wherein the device is to, in response to the determination that a difference between a measured volume and the projected volume exceeds an error threshold, modify the drilling in response to a notification.

Embodiment 18: The system of any one of Embodiments 14-16, wherein the device is to determine the projected volume of projected cuttings is based on a size of the borehole.

Embodiment 19: The system of any one of Embodiments 14-18, wherein the device is to, in response to a determination that a difference between a measured volume and the projected volume exceeds an error threshold, determine an indicator of improper borehole cleaning based on the measured volume of the downhole particles and at least one of change in torque of a drill string used for drilling the borehole, drag of the drill string, circulation density, and standpipe pressure.

Embodiment 20: The system of any one of Embodiments 12-19, wherein the device is to: determine angularity and size of the downhole particles based, at least in part, of the images; and in response to a determination of a change in at least one of the angularity and size of the downhole particles, output a notification of a downhole condition occurring based on the change in at least one of the angularity and size.

What is claimed is:

1. A method comprising:
performing a downhole operation in a borehole;
capturing, during the downhole operation, downhole particles at a surface from the borehole into a shaker screen;
emitting coherent electromagnetic radiation onto the downhole particles in the shaker screen;
determining a deflection of the coherent electromagnetic radiation emitted onto the downhole particles which results from contact of the coherent electromagnetic radiation with the downhole particles;
determining a velocity of the downhole particles on the shaker screen;
determining a distance between an initial line of coherent electromagnetic radiation emitted onto the downhole particles and a deflection of the initial line which results from contact with the downhole particles, wherein the deflection of the coherent electromagnetic radiation is the deflection of the initial line;
determining a surface area of the downhole particles based on the deflection of the initial line of the coherent electromagnetic radiation;
determining a measured volume of the downhole particles based on the velocity and surface area of the downhole particles; and
based on determining that a difference between the measured volume and a projected volume of anticipated downhole particles exceeds an error threshold, indicating a downhole condition occurring based on the measured volume.

2. The method of claim 1 further comprising:
in response to determining that the difference between the measured volume and the projected volume of anticipated downhole particles exceeds the error threshold, determining an indicator of improper borehole cleaning based on the measured volume of the downhole particles and at least one of change in torque of a drill string used for drilling the borehole, drag of the drill string, circulation density, and standpipe pressure.

3. The method of claim 1 further comprising:
determining angularity and size of the downhole particles based, at least in part, on captured images of the downhole particles; and
based on determining that there is a change in at least one of the angularity and the size of the downhole particles, indicating a downhole condition occurring based on the change in at least one of the angularity and the size.

4. The method of claim 1, further comprising determining the projected volume of anticipated downhole particles based on a size of the borehole.

5. A method comprising:
determining a projected volume of projected cuttings returning to a surface of Earth during drilling of a borehole to be drilled for a unit of depth and a unit of time;
drilling the borehole with a drill string having sections of drill pipe and a drill bit;
capturing, during the drilling, actual cuttings at the surface from the borehole into a shaker screen for the unit of depth of the borehole drilled for the unit of time;
emitting coherent electromagnetic radiation onto the actual cuttings in the shaker screen;
determining a deflection of the coherent electromagnetic radiation emitted onto the actual cuttings which results from contact of the coherent electromagnetic radiation with the actual cuttings;
determining a velocity of the actual cuttings on the shaker screen;
determining a distance between an initial line of the coherent electromagnetic radiation emitted onto the actual cuttings and a deflection of the initial line which results from contact with the actual cuttings, wherein the deflection of the coherent electromagnetic radiation is the deflection of the initial line; and
determining a surface area of the actual cuttings based on the distance;
determining a measured volume of the actual cuttings for the unit of depth and the unit of time based on the deflection of the coherent electromagnetic radiation, wherein determining the measured volume of the actual cuttings comprises determining the measured volume based on the velocity and the surface area; and
based on determining that a difference between the measured volume and the projected volume exceeds an error threshold, indicating a downhole condition that is occurring to be corrected by modifying the drilling.

6. The method of claim 5, further comprising:
determining a depth of the drill bit in the borehole based on a number of the sections of the drill pipe;
determining a lag based on the depth of the drill bit, a pump rate of drilling fluid through the drill string, and a volume of an annulus defined between the drill string and a wall of the borehole; and
determining a depth in the borehole from which the actual cuttings originate based on the depth of the drill bit and the lag.

7. The method of claim 5 further comprising, based on determining that the difference between the measured volume and the projected volume exceeds the error threshold, modifying the drilling.

8. The method of claim 7 further comprising,
based on determining that the difference between the measured volume and the projected volume exceeds the error threshold, determining that the measured volume is less that the projected volume,
wherein indicating the downhole condition comprises outputting a notification of cuttings build up in the borehole, and
wherein modifying the drilling comprises at least one of performing a clean out of cuttings in the borehole and replacing at least one of a reamer of the drill string and the drill bit.

9. The method of claim 7 further comprising,
based on determining that the difference between the measured volume and the projected volume exceeds the error threshold, determining that the measured volume is greater that the projected volume,
wherein indicating the downhole condition comprises outputting a notification of collapsing of the borehole, and wherein modifying the drilling comprises increasing a weight of a drilling mud being supplied through the drill string during the drilling.

10. The method of claim 5, wherein determining the projected volume of projected cuttings comprises determining the projected volume of projected cuttings based on a size of the borehole.

11. A system comprising:
a shaker screen onto which downhole particles and fluid from a borehole are to be placed, the downhole particles a product of a downhole operation;
a shaker to vibrate the shaker screen to separate the downhole particles from the fluid;
a coherent electromagnetic radiation emitter to emit coherent electromagnetic radiation onto the downhole particles on the shaker screen;
a camera to capture images of the coherent electromagnetic radiation being emitted onto the downhole particles;
a processor; and
a computer-readable medium having instructions stored thereon that are executable by the processor to cause the processor to,
based on analysis of the images of the coherent electromagnetic radiation emitted onto the downhole particles, determine a deflection of the coherent electromagnetic radiation which results from contact with the downhole particles;
determine a velocity of the downhole particles on the shaker screen;
determine a distance between an initial line of the coherent electromagnetic radiation emitted onto the downhole particles and a deflection of the initial line which results from contact with the downhole particles, wherein the deflection of the coherent electromagnetic radiation is the deflection of the initial line; and
determine a surface area of the downhole particles based on the distance; and
determine a volume of the downhole particles on the shaker screen based on the deflection of the coherent electromagnetic radiation, wherein the instructions executable by the processor to cause the processor to determine the volume of the downhole particles comprise instructions executable by the processor to cause the processor to determine the volume based on the velocity and the surface area.

12. The system of claim 11, wherein the downhole particles comprise cuttings, and further comprising:
a drill string having sections of drill pipe and a drill bit to drill the borehole, and
instructions executable by the processor to cause the processor to determine the volume of the cuttings for a unit of depth and a unit of time for the borehole being drilled based on the coherent electromagnetic radiation emitted into the cuttings.

13. The system of claim 12 further comprising instructions executable by the processor to cause the processor to,
determine a depth of the drill bit in the borehole based on a number of the sections of the drill pipe;
determine a lag based on the depth of the drill bit, a pump rate of drilling fluid through the drill string, and a volume of an annulus defined between the drill string and a wall of the borehole; and
determine a depth in the borehole from which the cuttings originate based on a depth of the drill bit and the lag.

14. The system of claim 13 further comprising instructions executable by the processor to cause the processor to,
determine a projected volume of projected cuttings returning to a surface of Earth during drilling of the borehole to be drilled for a unit of depth and a unit of time.

15. The system of claim 14, wherein the instructions to determine the projected volume of projected cuttings comprise instructions to determine the projected volume based on a size of the borehole.

16. The system of claim 14 further comprising instructions executable by the processor to cause the processor to,
based on a determination that a difference between the determined volume and the projected volume exceeds an error threshold, determine an indicator of improper borehole cleaning based on the determined volume of the downhole particles and at least one of change in torque of a drill string used for drilling the borehole, drag of the drill string, circulation density, and standpipe pressure.

17. The system of claim 11, further comprising instructions executable by the processor to cause the processor to:
determine angularity and size of the downhole particles based, at least in part, of the images; and
based on a determination of a change in at least one of the angularity and the size of the downhole particles, output a notification of a downhole condition occurring based on the change in at least one of the angularity and size.

* * * * *